US010516337B2

(12) United States Patent
Ojika et al.

(10) Patent No.: US 10,516,337 B2
(45) Date of Patent: Dec. 24, 2019

(54) DC VOLTAGE CONVERSION CIRCUIT

(71) Applicant: Mitsubishi Electric Corporation, Chiyoda-ku (JP)

(72) Inventors: Satoshi Ojika, Chiyoda-ku (JP); Tomokazu Sakashita, Chiyoda-ku (JP); Satoshi Shintaku, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/310,906

(22) PCT Filed: Apr. 13, 2017

(86) PCT No.: PCT/JP2017/015142
§ 371 (c)(1),
(2) Date: Dec. 18, 2018

(87) PCT Pub. No.: WO2018/025452
PCT Pub. Date: Feb. 8, 2018

(65) Prior Publication Data
US 2019/0348918 A1    Nov. 14, 2019

(30) Foreign Application Priority Data

Aug. 4, 2016   (JP) .................. 2016-153330

(51) Int. Cl.
*H02M 3/158*   (2006.01)
*H02M 1/14*    (2006.01)
(Continued)

(52) U.S. Cl.
CPC ......... *H02M 3/1584* (2013.01); *H02M 1/088* (2013.01); *H02M 1/14* (2013.01);
(Continued)

(58) Field of Classification Search
CPC ............. H02M 3/1584; H02M 1/4225; H02M 7/2173; H02M 7/2176
(Continued)

(56) References Cited

U.S. PATENT DOCUMENTS

2005/0040796 A1   2/2005   Sutardja
2005/0040800 A1   2/2005   Sutardja
(Continued)

FOREIGN PATENT DOCUMENTS

| JP | 2005-143284 A | 6/2005 |
|---|---|---|
| JP | 2006-149054 A | 6/2006 |
| JP | 2009-170620 A | 7/2009 |

OTHER PUBLICATIONS

International Search Report dated May 16, 2017 in PCT/JP2017/015142 filed Apr. 13, 2017.
(Continued)

*Primary Examiner* — Gary A Nash
(74) *Attorney, Agent, or Firm* — Oblon, McClelland, Maier & Neustadt, L.L.P.

(57) ABSTRACT

A DC voltage conversion circuit in which the miniaturization of the inductor is attained and the frequency of control band can be widened, by suppressing the ripple current which flows into the inductor using a general magnetic core without using a special multi-leg magnetic core. A DC voltage conversion circuit is provided with two sets of magnetic flux cancellation conversion circuits each of which is provided with two sets of series circuits of two semiconductor circuits, a first magnetic flux cancellation type transformer, and a inductor; a second magnetic flux cancellation type transformer connected to the two sets of magnetic flux cancellation conversion circuits; and a control circuit which controls switching devices of semiconductor circuits.

11 Claims, 13 Drawing Sheets

(51) Int. Cl.
*H02M 1/088* (2006.01)
*H02M 1/00* (2006.01)
*H02M 7/217* (2006.01)
*H02M 1/42* (2007.01)

(52) U.S. Cl.
CPC ........ *H02M 1/4225* (2013.01); *H02M 7/2173* (2013.01); *H02M 7/2176* (2013.01); *H02M 2001/0009* (2013.01); *H02M 2003/1586* (2013.01)

(58) Field of Classification Search
USPC .................. 323/271, 272; 363/65, 67, 68
See application file for complete search history.

(56) References Cited

U.S. PATENT DOCUMENTS

| | | | |
|---|---|---|---|
| 2006/0103359 | A1 | 5/2006 | Watanabe et al. |
| 2008/0049475 | A1 | 2/2008 | Watanabe et al. |
| 2009/0128101 | A1* | 5/2009 | Skinner ............... H02M 3/1584 323/220 |
| 2009/0180305 | A1 | 7/2009 | Hashino et al. |
| 2010/0097041 | A1* | 4/2010 | Ayukawa ............ H02M 1/4225 323/272 |
| 2010/0277141 | A1 | 11/2010 | Sutardja |
| 2010/0320994 | A1 | 12/2010 | Hashino et al. |
| 2012/0249105 | A1* | 10/2012 | Nussbaum .......... H02M 3/1584 323/283 |
| 2012/0249280 | A1* | 10/2012 | Nussbaum .......... H01F 27/2804 336/192 |
| 2012/0250363 | A1* | 10/2012 | Skinner ............... H02M 3/1584 363/21.12 |
| 2014/0056037 | A1* | 2/2014 | Iijima ................. H02M 3/1584 363/21.17 |

OTHER PUBLICATIONS

Texas Instruments Inc. "The Right-Half-Plane Zero—A Simplified Explanation,", 2001, 5 pages.

Japanese Office Action dated Aug. 22, 2017 in Application No. 2017-537332, citing document AQ (with English language translation).

* cited by examiner

MODE 0

MODE 1

MODE 2

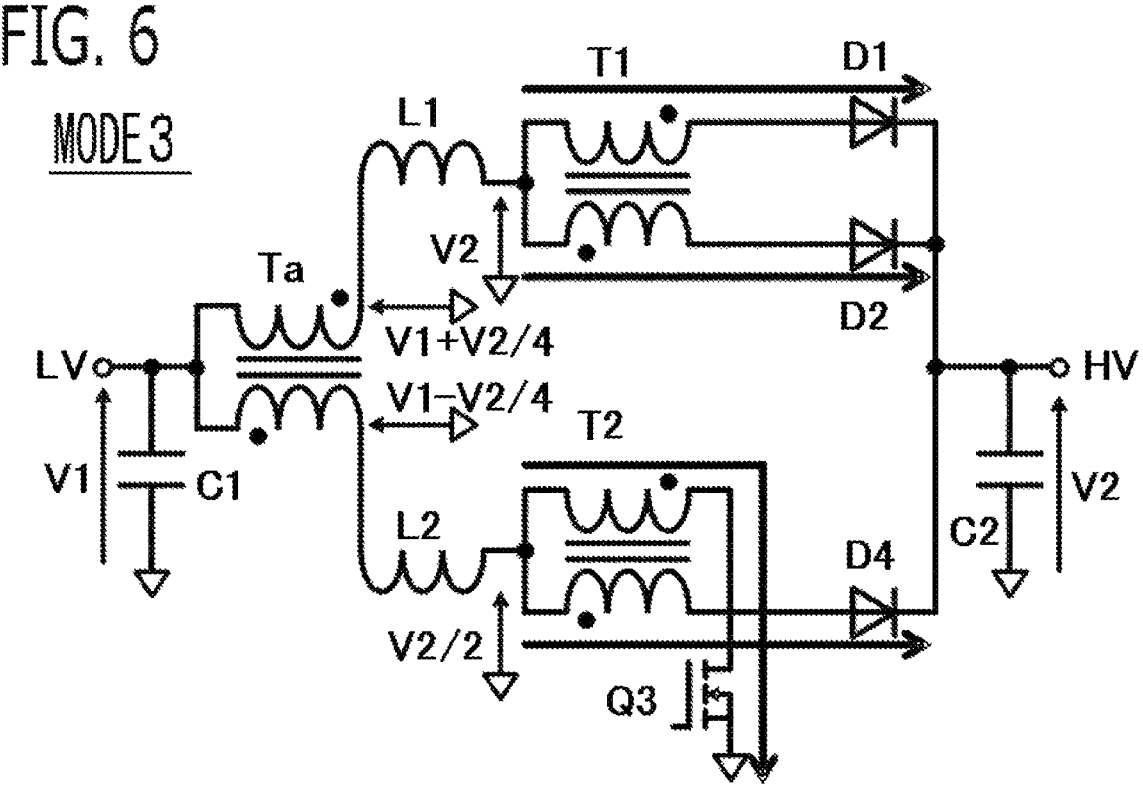
FIG. 6 MODE 3
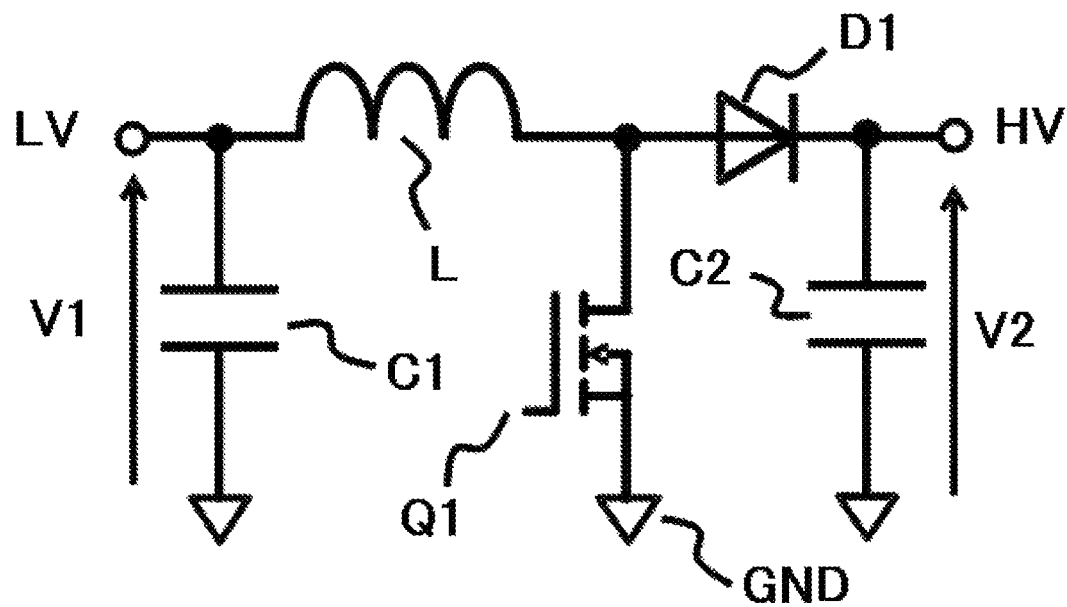
FIG. 7

FIG. 17
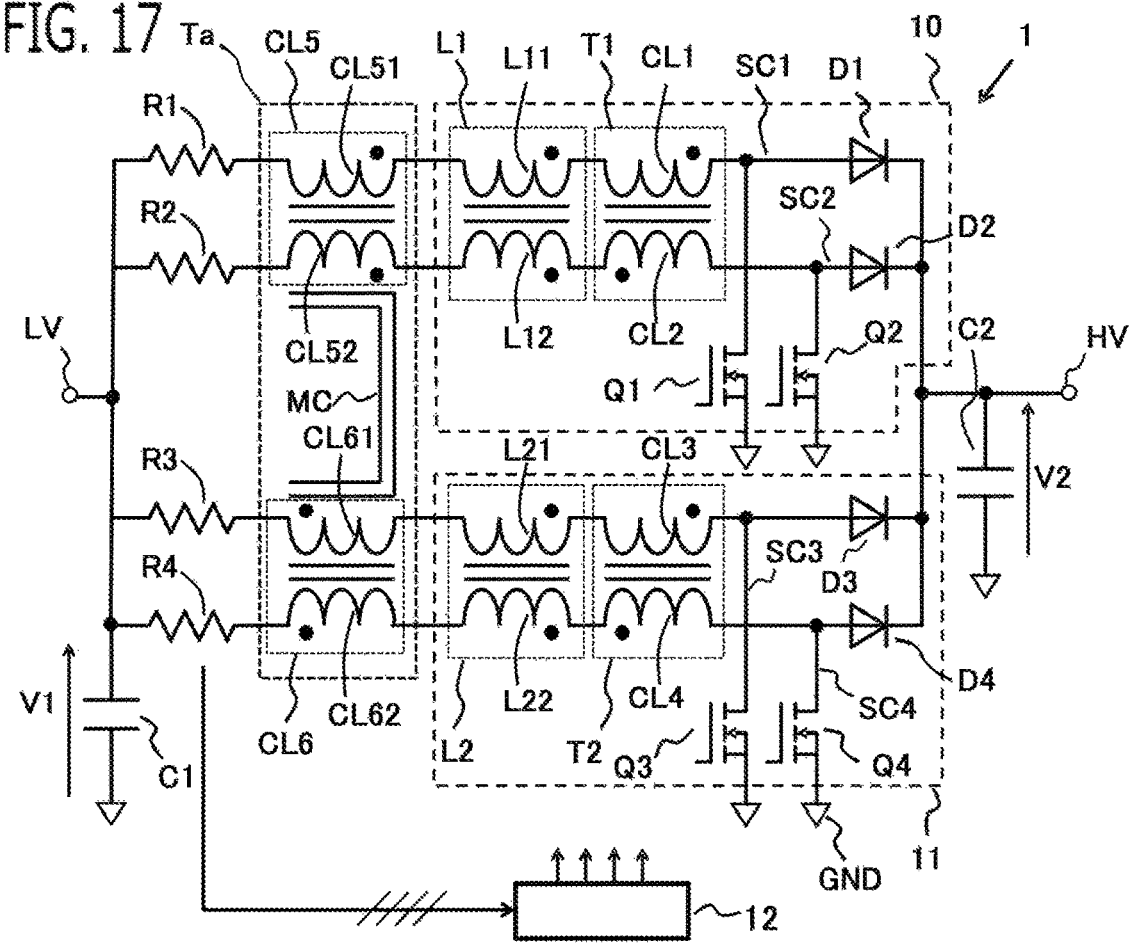
FIG. 18
COUPLING INDUCTOR
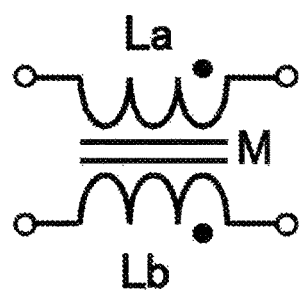
T-TYPE EQUIVALENT CIRCUIT
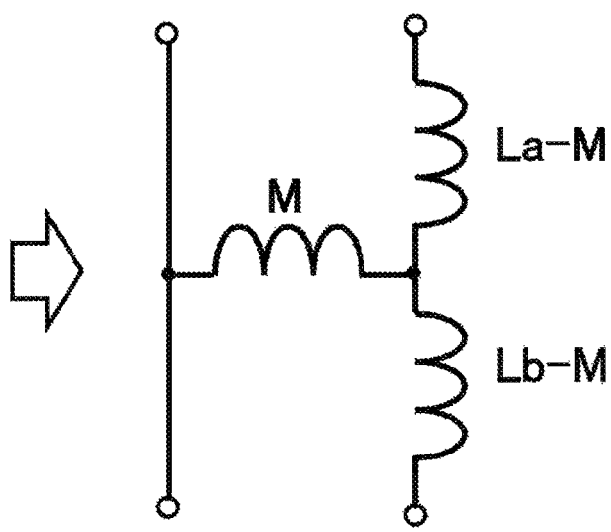

DC VOLTAGE CONVERSION CIRCUIT

TECHNICAL FIELD

Present disclosure relates to a voltage conversion circuit (DC-DC converter) which converts a voltage of DC electric power.

BACKGROUND ART

A DC voltage conversion circuit is mounted on an apparatus which requires a stable DC voltage, and an apparatus which requires different DC voltage from a primary power supply. For example, in an apparatus, such as an electric vehicle, a satellite, which mounts a secondary battery and operates by DC, a switching-type DC voltage conversion circuit is used in order to stabilize a power source voltage which fluctuates depending on battery residue amount and obtain DC voltage necessary for load. In such a switching power supply, it is required to suppress the fluctuation of voltage and the like, while reducing size of passive components for miniaturization.

The switching power supply obtains a DC voltage, which is different from an input, by switching voltage and current using a switching device such as a semiconductor and smoothing using an inductor and a capacitor. In order to obtain a low ripple voltage and current, it is necessary to enlarge a value of an inductor or a capacitor, and the size of switching power supply is regulated by the size of these components.

On the other hand, there is known a technology of canceling ripple current by operating in parallel plural switching power supply circuits which operate with different phases mutually. According to this technology, even if the ripple current of each switching power supply circuit is large, in the whole apparatus, ripple current is canceled and the ripple of total current can be made small.

PLT 1 and PLT 2 disclose a technology which makes generated ripple current itself small by coupling magnetically plural switching power supply circuits which operate with different phases. According to these technologies, an inductor smaller than the conventional switching power supply circuit can be used, and the miniaturization of apparatus can be achieved.

CITATION LIST

Patent Literature

PLT 1: JP 2009-170620 A
PLT 2: JP 2006-149054 A

Non Patent Literature

Non patent literature 1: Texas Instruments Inc. "THE RIGHT-HALF-PLANE ZERO—A SIMPLIFIED EXPLANATION", http://www.ti.com/lit/ml/slup084/slup084.pdf

SUMMARY OF INVENTION

Technical Problem

A step-up converter for obtaining DC voltage higher than an inputted DC voltage has a zero point on the right half plane of the Laplace plane, as shown in the equation (7) of the Non patent literature 1 and the like. In a region greater than or equal to a frequency of this zero point, since a gain is constant and only a phase is delayed, a phase margin is not obtained in a feedback control system, but it becomes a hindrance of stability securing. Accordingly, in the step-up converter, by lowering a control band enough from the zero point frequency, a phase margin is secured, and it is constituted to become a stable feedback control system. Accordingly, control band width must be made narrower than zero point frequency, and it becomes impossible to respond immediately to rapid load fluctuation. That is to say, when load current is fluctuated and output voltage is fluctuated, it takes a long time for recovering to desired output voltage. In such a step-up converter, in order to suppress fluctuation of output voltage, a large capacity output capacitor is required, and it becomes a hindrance of the miniaturization.

The DC voltage conversion circuit by PLT 1 can suppress ripple current by using the magnetic flux cancellation type transformer of polyphase. Since ripple current becomes small, the miniaturization of the inductor is attained, and the inductance value of the inductor can be lowered, the frequency of control band can be widened. On the other hand, since a special magnetic core which has greater than or equal to three multi-leg is required in order to constitute a magnetic flux cancellation type transformer of polyphase greater than or equal to three phase, there is a problem that a shape of the magnetic core is restricted and especially implementation using a general magnetic core which is marketed is difficult.

The present disclosure has been implemented in order to solve such a problem, and an objective thereof is to provide a DC voltage conversion circuit in which the miniaturization of the inductor is attained and the frequency of control band can be widened, by suppressing the ripple current which flows into the inductor using a general magnetic core without using a special multi-leg magnetic core.

Solution to Problem

A DC voltage conversion circuit according to the present disclosure is a non-isolated type DC voltage conversion circuit which converts DC voltage between a low voltage side terminal and a high voltage side terminal, the DC voltage conversion circuit including:

two sets of magnetic flux cancellation conversion circuits each of which is provided with two sets of series circuits in each of which a lower semiconductor circuit connected to a reference potential and an upper semiconductor circuit connected to a high voltage side terminal are connected in series; a first magnetic flux cancellation type transformer which has a primary winding whose one end is connected to an intermediate connection point of a first set of the series circuit, and a secondary winding whose one end is connected to an intermediate connection point of a second set of the series circuit; and an inductor whose one end is connected to the other end of the primary winding and the other end of the secondary winding of the first magnetic flux cancellation type transformer;

a second magnetic flux cancellation type transformer which has a primary winding whose one end is connected to the other end of the inductor of a first set of the magnetic flux cancellation conversion circuit, and a secondary winding whose one end is connected to the other end of the inductor of a second set of the magnetic flux cancellation conversion circuit; and in which the other end of the primary winding and the other end of the secondary winding are connected to the low voltage side terminal; and a control circuit which controls the semiconductor circuits, wherein one or both of a step-up operation which steps up DC voltage from the low voltage side terminal to the high voltage side terminal, and a step-down operation which steps down DC voltage from the high voltage side terminal to the low voltage side terminal are possible, in a case where at least the step-up operation is possible, the lower semiconductor circuit is provided with at least a switching device, and the upper semiconductor circuit is provided with at least a diode, in a case where at least the step-down operation is possible, the lower semiconductor circuit is provided with at least a diode, and the upper semiconductor circuit is provided with at least a switching device.

Advantage of Invention

According to the DC voltage conversion circuit of the present disclosure, in each of the first set and the second set of magnetic flux cancellation conversion circuits, the ripple current generated by the on-off drive of the switching device of the first series circuit, and the ripple current generated by the on-off drive of the switching device of the second series circuit can be canceled and reduced by the first magnetic flux cancellation type transformer. Furthermore, the ripple current generated by the first set of magnetic flux cancellation conversion circuit, and the ripple current generated by the second set of magnetic flux cancellation conversion circuit can be canceled and reduced by the second magnetic flux cancellation type transformer. Therefore, by arranging the general magnetic flux cancellation conversion circuit which is provided with the primary winding and the secondary winding in two stages, the ripple current can be reduced significantly, without providing the special magnetic flux cancellation conversion circuit which has a magnetic core of four legs as PLT 1. Since the ripple current is reduced, the inductance of the inductors can be lowered, the inductors can be miniaturized, and the frequency of control band can be increased.

BRIEF DESCRIPTION OF THE DRAWINGS

FIG. 6 is a figure explaining the operation in the case of driving the DC voltage conversion circuit in the mode 3 of FIG. 2 according to Embodiment 1.

FIG. 7 is a circuit diagram showing one phase step-up circuit according to a comparative example.

FIG. 17 is a circuit diagram showing a configuration of a DC voltage conversion circuit according to other Embodiments.

FIG. 18 is a figure showing the T-type equivalent circuit of a coupling inductor according to other Embodiments.

DETAILED DESCRIPTION OF THE EMBODIMENTS

Embodiment 1

Figure 1:
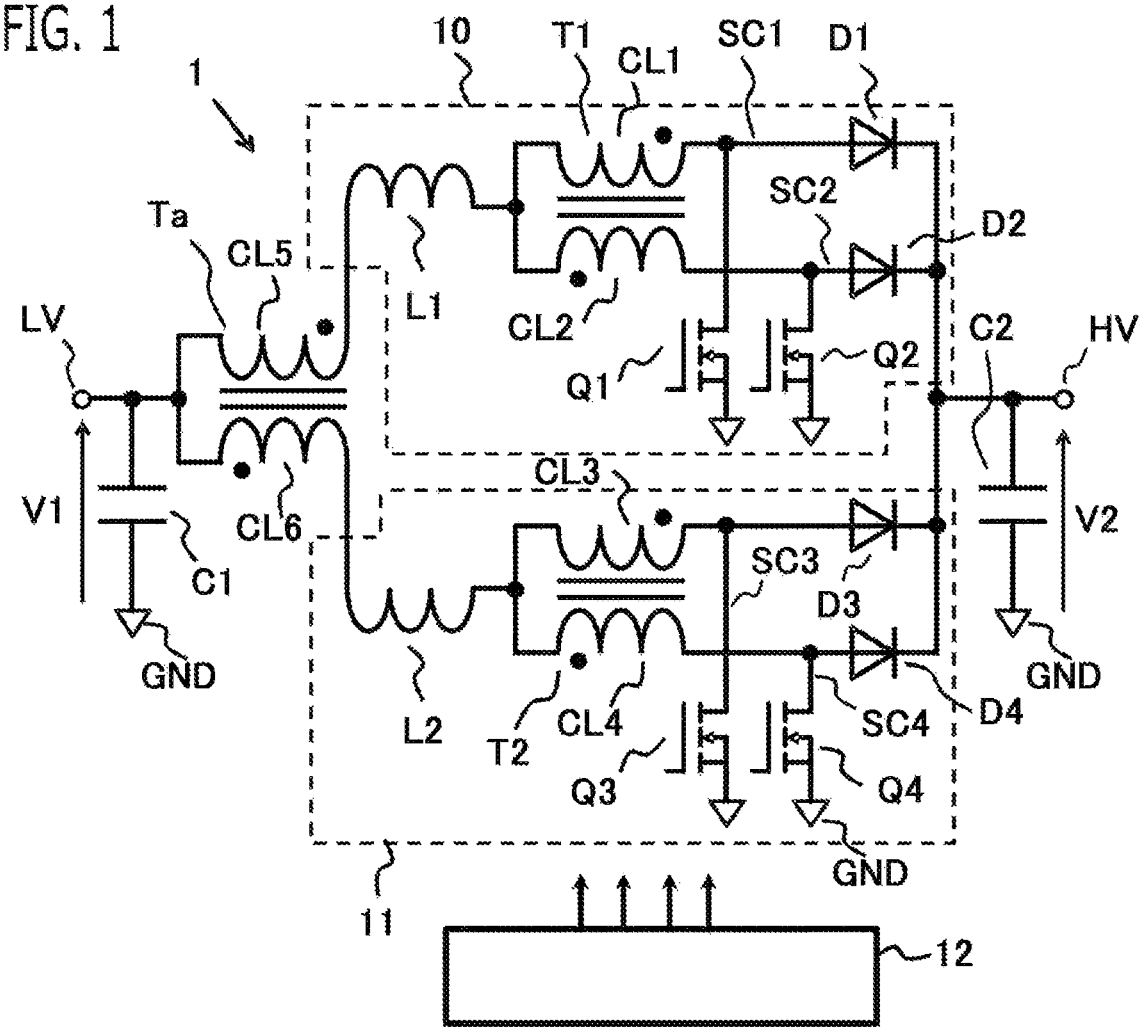
FIG. 1 is a circuit diagram showing a configuration of a DC voltage conversion circuit according to Embodiment 1.

A DC voltage conversion circuit 1 according to Embodiment 1 will be explained with reference to drawings. FIG. 1 is a circuit diagram of the DC voltage conversion circuit 1. The DC voltage conversion circuit 1 has a low voltage side terminal LV and a high voltage side terminal HV, and is a non-isolated type DC voltage conversion circuit which converts DC voltage between the low voltage side terminal LV and the high voltage side terminal HV. The low voltage side terminal LV is connected to a positive electrode terminal of a low voltage side DC power source, and the high voltage side terminal HV is connected to a positive electrode terminal of a high voltage side DC power source. The DC voltage conversion circuit 1 has a reference potential terminal (unillustrated) which generates a common reference potential GND to the low voltage side terminal LV and the high voltage side terminal HV. The reference potential terminal is connected to a negative electrode terminal of the low voltage side DC power source, and a negative electrode terminal of the high voltage side DC power source.

The DC voltage conversion circuit 1 is provided with two sets of magnetic flux cancellation conversion circuits of a first set of magnetic flux cancellation conversion circuit 10 and a second set of magnetic flux cancellation conversion circuit 11. The first set of magnetic flux cancellation conversion circuit 10 is provided with two sets of series circuits of a first series circuit SC1 and a second series circuit SC2, a first magnetic flux cancellation type transformer T1, and an inductor L1. The first series circuit SC1 has a lower semiconductor circuit Q1 connected to the reference potential GND, and an upper semiconductor circuit D1 connected to the high voltage side terminal HV; and the lower semiconductor circuit Q1 and the upper semiconductor circuit D1 are connected in series. The second series circuit SC2 has a lower semiconductor circuit Q2 connected to the reference potential GND, and an upper semiconductor circuit D2 connected to the high voltage side terminal HV; and the lower semiconductor circuit Q2 and the upper semiconductor circuit D2 are connected in series. The first magnetic flux cancellation type transformer T1 has a primary winding CL1 and a secondary winding CL2; one end of the primary winding CL1 is connected to an intermediate connection point of the upper and lower semiconductor circuits Q1, D1 of the first series circuit SC1; and one end of the secondary winding CL2 is connected to an intermediate connection point of the upper and lower semiconductor circuits Q2, D2 of the second series circuit SC2. One end of the inductor L1 is connected to the other end of the primary winding CL1 and the other end of the secondary winding CL2 of the first magnetic flux cancellation type transformer T1.

The second set of magnetic flux cancellation conversion circuit 11 has a configuration similar to the first set of magnetic flux cancellation conversion circuit 10. That is, the second set of magnetic flux cancellation conversion circuit 11 is provided with 2 sets of series circuits of a first series circuit SC3 and a second series circuit SC4, a first magnetic flux cancellation type transformer T2, and an inductor L2. The first series circuit SC3 has a lower semiconductor circuit Q3 connected to the reference potential GND, and an upper semiconductor circuit D3 connected to the high voltage side terminal HV; and the lower semiconductor circuit Q3 and the upper semiconductor circuit D3 are connected in series. The second series circuit SC4 has a lower semiconductor circuit Q4 connected to the reference potential GND, and an upper semiconductor circuit D4 connected to the high voltage side terminal HV; and the lower semiconductor circuit Q4 and the upper semiconductor circuit D4 are connected in series. The first magnetic flux cancellation type transformer T2 has a primary winding CL3 and a secondary winding CL4; one end of the primary winding CL3 is connected to an intermediate connection point of the upper and lower semiconductor circuits Q3, D3 of the first series circuit SC3; and one end of the secondary winding CL4 is connected to an intermediate connection point of the upper and lower semiconductor circuits Q4, D4 of the second series circuit SC4. One end of the inductor L2 is connected to the other end of the primary winding CL3 and the other end of the secondary winding CL4 of the first magnetic flux cancellation type transformer T2.

In the present embodiment, the DC voltage conversion circuit 1 is capable of a step-up operation which steps up DC voltage from the low voltage side terminal LV to the high voltage side terminal HV. Each of the first set and second set of lower semiconductor circuits Q1, Q2, Q3, Q4 is provided with a switching device; and each of the first set and second set of upper semiconductor circuits D1, D2, D3, D4 is provided with a diode.

A cathode terminal of each diode D1 to D4 is connected to the high voltage side terminal HV; an anode terminal of each diode D1 to D4 is connected to a drain terminal of each switching device Q1 to Q4; and a source terminal of each switching device Q1 to Q4 is connected to the reference potential GND. A gate signal outputted from the control circuit 12 is inputted into a gate terminal of each switching device Q1 to Q4. When the gate signal is High, each switching device Q1 to Q4 is turned on (closed circuit state), and when the gate signal is Low, each switching device Q1 to Q4 is turned off (open circuit state). An FET (Field Effect Transistor) is used for each switching device Q1 to Q4. Alternatively, other kinds of switching device such as an IGBT (Insulated Gate Bipolar Transistor) may be used for each switching device Q1 to Q4.

The DC voltage conversion circuit 1 is provided with a second magnetic flux cancellation type transformer Ta which has a primary winding CL5 and a secondary winding CL6. One end of the primary winding CL5 is connected to the other end of the inductor L1 of the first set of magnetic flux cancellation conversion circuit 10. One end of the secondary winding CL6 is connected to the other end of the inductor L2 of the second set of magnetic flux cancellation conversion circuit 11. The other end of the primary winding CL5 and the other end of the secondary winding CL6 are connected to the low voltage side terminal LV.

In each magnetic flux cancellation type transformers T1, T2, Ta, the primary winding and the secondary winding are wound around one magnetic core in directions opposite each other; and a magnetic flux of the primary winding and a magnetic flux of the secondary winding are canceled by each other. The primary winding and the secondary winding are wound around the magnetic core by a turn ratio of 1:1, and cancel magnetic flux by 1:1.

Each magnetic flux cancellation type transformer T1, T2, Ta and each inductor L1, L2 may be electrically equivalent to FIG. 1; and they are not necessary to be individual components. For example, leakage inductances of the primary winding CL5 and the secondary winding CL6 of the second magnetic flux cancellation type transformer Ta may be used as the first set of inductor L1 and the second set of inductor L2, respectively. The leakage inductances of the primary winding CL1 and the secondary winding CL2 of the first set of first magnetic flux cancellation type transformer T1 may be used as the first set of inductor L1; and the leakage inductances of the primary winding CL3 and the secondary winding CL4 of the second set of first magnetic flux cancellation type transformer T2 may be used as the second set of inductor L2. It is also possible to combine these.

Since AC is main in the magnetic flux of each magnetic flux cancellation type transformer T1, T2, Ta, and DC is main in the magnetic flux of each inductor L1, L2, a magnetic core of each magnetic flux cancellation type transformer T1, T2, Ta may be composed of a material with small iron loss at AC excitation, and a magnetic core of each inductor L1, L2 may be composed of a material with a good DC superimposing characteristic with a large saturation magnetic flux density. In this way, it is also possible to achieve loss reduction and miniaturization by using different core materials.

The DC voltage conversion circuit 1 is provided with a low voltage side smoothing capacitor C1 connected between the low voltage side terminal LV and the reference potential GND, and a high voltage side smoothing capacitor C2 connected between the high voltage side terminal HV and the reference potential GND. Although the low voltage side smoothing capacitor C1 and the high voltage side smoothing capacitor C2 are for suppressing the ripple voltage and the ripple current of the apparatus, they can be omitted if the ripple voltage and the ripple current which the DC voltage conversion circuit 1 generates can be allowed.

<Control Circuit 12>

The DC voltage conversion circuit 1 is provided with a control circuit 12 which controls the semiconductor circuits. The control circuit 12 generates gate signals which perform on-off driving control of each switching device Q1 to Q4 by PWM (Pulse Width Modulation) control, respectively. The control circuit 12 is provided with processing circuits which perform on-off driving control of each switching device Q1 to Q4. The processing circuits of the control circuit 12 may be configured by analog electronic circuits, such as a comparator, an operational amplifier, and a differential amplifying circuit; may be configured by digital electronic circuits, such as a computing processing unit and a storage apparatus; and may be configured by both of analog electronic circuits and digital electronic circuits.

Figure 2:
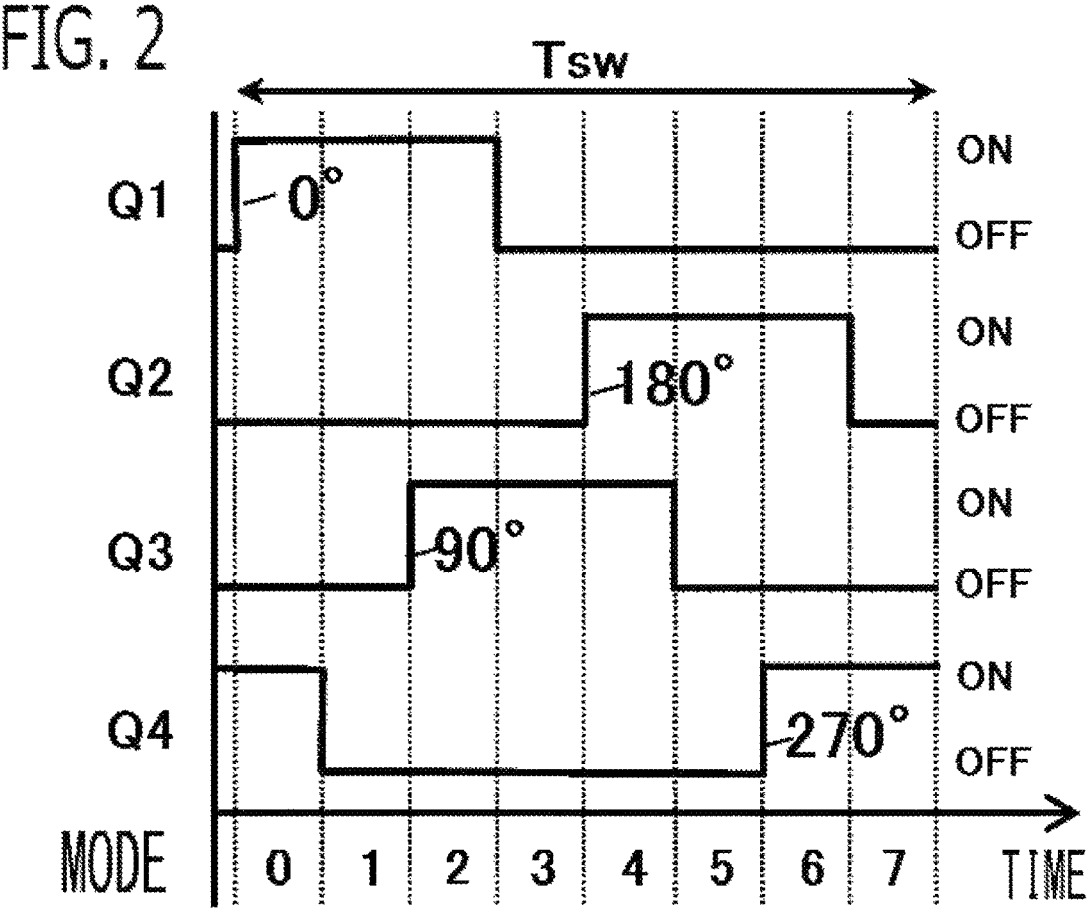
FIG. 2 is a timing chart showing the operation of the DC voltage conversion circuit according to Embodiment 1.

FIG. 2 shows a timing chart which shows an example of the gate signals of each switching device Q1 to Q4 according to the present embodiment. As shown in FIG. 2, the control circuit 12 differs the respective on-off driving timings of each switching device Q1 to Q4 with each other. According to this configuration, in each of the first set and the second set of magnetic flux cancellation conversion circuits 10, 11, the ripple current generated by the on-off drive of the switching device of the first series circuit, and the ripple current generated by the on-off drive of the switching device of the second series circuit can be canceled and reduced by the first magnetic flux cancellation type transformer. Furthermore, the ripple current generated by the first set of magnetic flux cancellation conversion circuit 10, and the ripple current generated by the second set of magnetic flux cancellation conversion circuit 11 can be canceled and reduced by the second magnetic flux cancellation type transformer Ta. Therefore, by arranging the general magnetic flux cancellation conversion circuits each of which is provided with the primary winding and the secondary winding in two stages, the ripple current can be reduced significantly, without providing the special magnetic flux cancellation conversion circuit which has a magnetic core of four legs as PLT 1. Since the ripple current is reduced, the inductance of the inductors can be lowered, the inductors can be miniaturized, and the frequency of control band can be increased, and also the capacity of the capacitors can be lowered and the capacitors can be miniaturized.

The control circuit 12 turns on the switching device Q1 of the first series circuit SC1 and the switching device Q2 of the second series circuit SC2 in the first set of magnetic flux cancellation conversion circuit 10 once respectively at an equal interval alternately in the switching period Tsw. The control circuit 12 turns on the switching device Q3 of the first series circuit SC3 and the switching device Q4 of the second series circuit SC4 in the second set of magnetic flux cancellation conversion circuit 11 once respectively at an equal interval alternately in the switching period Tsw. The control circuit 12 increases or decreases an ON period (ON duty ratio) of each switching device Q1 to Q4 in the switching period Tsw according to a voltage boosting ratio which is set to a target. The voltage boosting ratio is a ratio of a voltage of the high voltage side terminal HV to a voltage of the low voltage side terminal LV (=voltage of the high voltage side terminal HV/voltage of the low voltage side terminal LV).

In each of the first set and the second set of magnetic flux cancellation conversion circuits 10, 11, a phase difference between the on-off driving timing of the switching device of the first series circuit and the on-off driving timing of the switching device of the second series circuit is set to 180 degrees. Therefore, in each set, the ripple current generated by the on-off drive of the switching device of the first series circuit and the ripple current generated by the on-off drive of the switching device of the second series circuit can be canceled and reduced effectively by the first magnetic flux cancellation type transformer.

The switching periods Tsw of the respective switching devices Q1 to Q4 are made all the same. The control circuit 12 provides a phase difference between the on-off driving timings of the switching devices Q1, Q2 of the first set of magnetic flux cancellation conversion circuit 10, and the on-off driving timings of the switching devices Q3, Q4 of the second set of magnetic flux cancellation conversion circuit 11.

According to this configuration, the ripple current generated by the first set of magnetic flux cancellation conversion circuit 10, and the ripple current generated by the second set of magnetic flux cancellation conversion circuit 11 can be canceled and reduced by the second magnetic flux cancellation type transformer Ta.

In the present embodiment, the phase difference of the on-off driving timing between the first set of switching devices Q1, Q2 and the second set of switching devices Q3, Q4 is set to 90 degrees. According to this configuration, the phases of the on-off driving timing of the respective switching devices Q1 to Q4 are shifted by an equal phase angle interval of 90 degrees each. By the first and the second magnetic flux cancellation type transformer, the ripple current generated by the on-off drive of each switching device Q1 to Q4 can be reduced effectively without deviation. Therefore, reduction effect of the ripple current can be maximized.

An angle which expresses the phase difference such as 90 degrees becomes an angle obtained by multiplying 360 degrees to a value obtained by dividing a period difference of the on-off driving timings by the switching period Tsw. Therefore, when the phase difference is 90 degrees, the period difference of the on-off driving timings is ¼ of the switching period Tsw.

<Detailed Explanation of Circuit Operation>

FIG. 3 to FIG. 6 are figures for explaining the circuit operation corresponding to each mode shown in FIG. 2. Here, it is explained by supposing that an excitation inductance of each magnetic flux cancellation type transformer T1, T2, Ta is large enough, and each magnetic flux cancellation type transformer T1, T2, Ta operates as an ideal transformer. It is explained by supposing that the turn ratio of each magnetic flux cancellation type transformer T1, T2, Ta is 1:1. In order to explain simply, it is explained under the conditions considered that the inductance of each inductor L1, L2 is large enough, and the current value in the switching period Tsw becomes constant.

Figure 3:
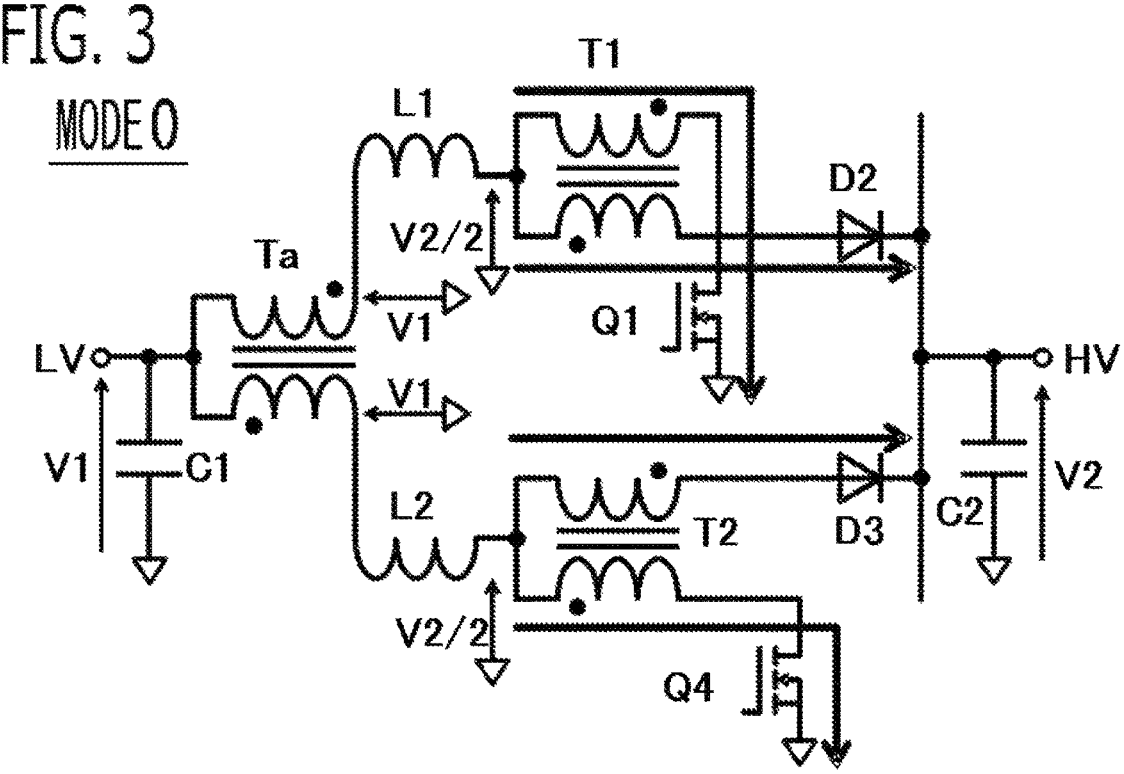
FIG. 3 is a figure explaining the operation in the case of driving the DC voltage conversion circuit in the mode 0 of FIG. 2 according to Embodiment 1.

As shown in FIG. 3, in the mode 0, the switching device Q1 of the first set of first series circuit SC1 and the switching device Q4 of the second set of second series circuit SC4 are turned ON. At this time, the diode D2 of the first set of second series circuit SC2 and the diode D3 of the second set of first series circuit SC3 are energized. Accordingly, the primary winding and the secondary winding of each set of the first magnetic flux cancellation type transformer T1, T2 are in a state of connecting in series; and the high voltage side terminal voltage V2 is applied to each set of the primary winding and the secondary winding. Since the turn ratio of each set of the primary winding and the secondary winding is 1:1, V2/2 are applied to each of the primary winding and the secondary winding. Therefore, since the potential of the connection node between the first set of first magnetic flux cancellation type transformer T1 and the inductor L1 and the potential of the connection node between the second set of first magnetic flux cancellation type transformer T2 and the inductor L2 becomes the same V2/2, voltage is not applied to the windings of the second magnetic flux cancellation type transformer Ta. Accordingly, the potential of the connection node between the first set of inductor L1 and the second magnetic flux cancellation type transformer Ta, and the potential of the connection node between the second set of inductor L2 and the second magnetic flux cancellation type transformer Ta becomes the same V1. Accordingly, the same V1−V2/2 is applied to the first set of inductor L1 and the second set of inductor L2.

Figure 4:
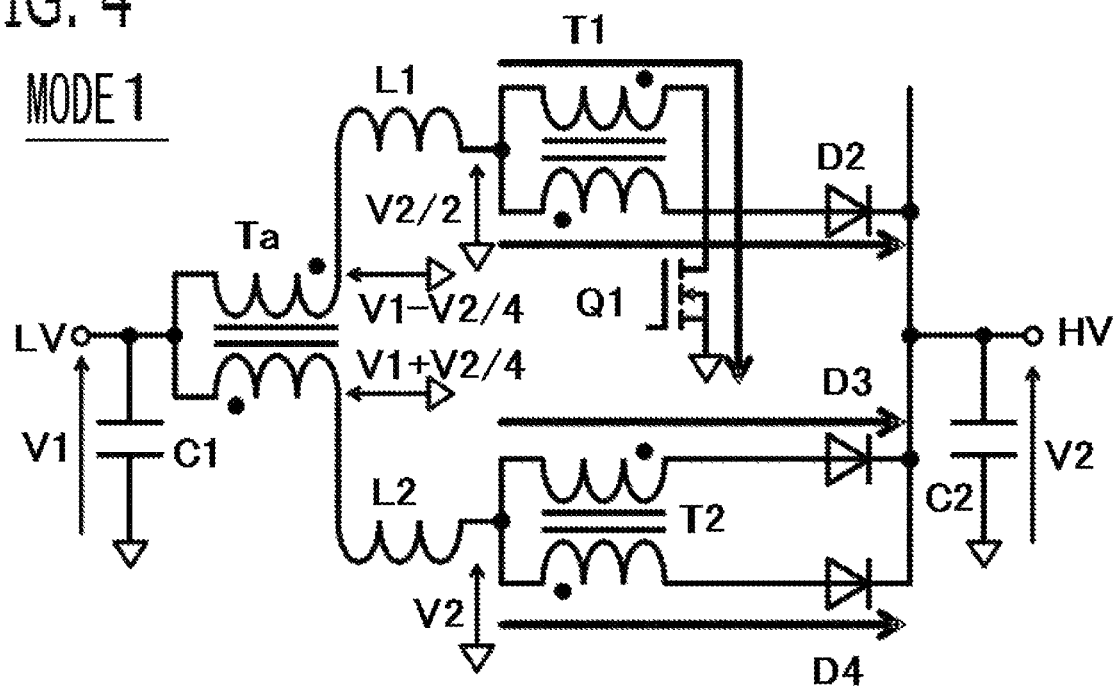
FIG. 4 is a figure explaining the operation in the case of driving the DC voltage conversion circuit in the mode 1 of FIG. 2 according to Embodiment 1.

As shown in FIG. 4, in the mode 1, only the switching device Q1 of the first set of first series circuit SC1 is turned on. At this time, the diode D2 of the first set of second series circuit SC2, the diode D3 of the second set of first series circuit SC3, and the diode D4 of the second set of second series circuit SC4 are energized. Since the state of the first set of magnetic flux cancellation conversion circuit 10 is the same as the mode 0, the potential of the connection node between the first set of first magnetic flux cancellation type transformer T1 and the inductor L1 becomes V2/2. Since the potential of the connection node between the second set of first magnetic flux cancellation type transformer T2 and each diode D3, D4 becomes the same V2, voltage is not applied to the windings of the magnetic flux cancellation type transformer T2. Accordingly, the potential of the connection node between the second set of first magnetic flux cancellation type transformer T2 and the inductor L2 becomes V2. Thereby, a differential voltage of V2/2 in total is applied to the circuit where the primary winding and the secondary winding of the second magnetic flux cancellation type transformer Ta are connected in series. Since the turn ratio of the second magnetic flux cancellation type transformer Ta is 1:1, V2/4 is applied to the primary winding and the secondary winding, respectively. Therefore, the potential of the connection node between the first set of inductor L1 and the second magnetic flux cancellation type transformer Ta becomes V1−V2/4, and the potential of the connection node between the second set of inductor L2 and the second magnetic flux cancellation type transformer Ta becomes V1+V2/4. Thereby, V1−V2×¾ is applied to the first set of inductor L1 and the second set of inductor L2.

Figure 5:
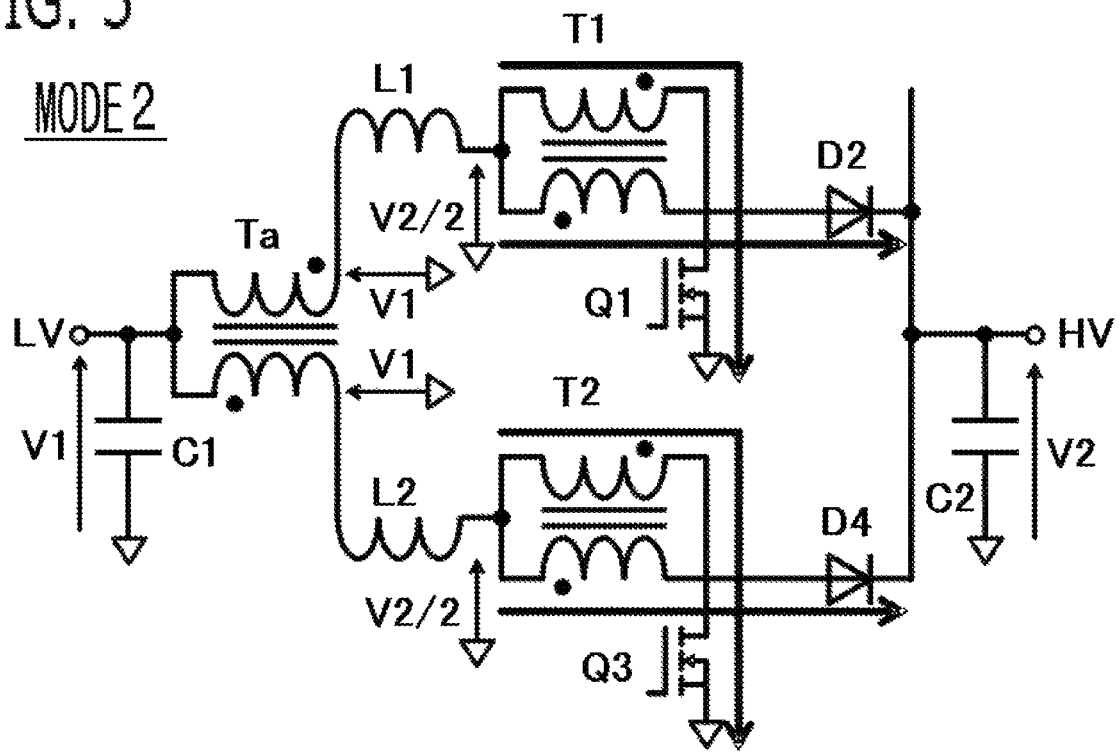
FIG. 5 is a figure explaining the operation in the case of driving the DC voltage conversion circuit in the mode 2 of FIG. 2 according to Embodiment 1.

As shown in FIG. 5, in the mode 2, the switching device Q1 of the first set of first series circuit SC1 and the switching device Q3 of the second set of first series circuit SC3 are turned on. At this time, the diode D2 of the first set of second series circuit SC2 and the diode D4 of the second set of second series circuit SC4 are energized. Since the state of the first set of magnetic flux cancellation conversion circuit 10 is the same as the mode 0 and 1, the potential of the connection node between the first set of first magnetic flux cancellation type transformer T1 and the inductor L1 becomes V2/2. In a state of the second set of magnetic flux cancellation conversion circuit 11, since the first series circuit SC3 and the second series circuit SC4 in the mode 0 are exchanged, a voltage with the same magnitude as the mode 0 and the reverse direction to the mode 0 is applied to the windings of the second set of first magnetic flux cancellation type transformer T2. As a result, the potential of the connection node between the second set of first magnetic flux cancellation type transformer T2 and the inductor L2 becomes V2/2 as same as the mode 0. Therefore, similar to the mode 0, the potential of the connection node between the first set of first magnetic flux cancellation type transformer T1 and the inductor L1, and the potential of the connection node between the second set of first magnetic flux cancellation type transformer T2 and the inductor L2 become the same V2/2. Therefore, similar to the mode 0, the same V1−V2/2 is applied to the first set of inductor L1 and the second set of inductor L2.

As shown in FIG. 6, in the mode 3, only the switching device Q3 of the second set of first series circuit SC3 is turned on. At this time, the diode D1 of the first set of first series circuit SC1, the diode D2 of the first set of second series circuit SC2, and the diode D4 of the second set of second series circuit SC4 are energized. Since the potential of the connection node between the first set of first magnetic flux cancellation type transformer T1 and each diode D1, D2 become the same V2, voltage is not applied to the windings of the magnetic flux cancellation type transformer T1. Accordingly, the potential of the connection node between the first set of first magnetic flux cancellation type trans-former T1 and the inductor L1 becomes V2. Since the state of the second set of magnetic flux cancellation conversion circuit 11 is the same as the mode 2, the potential of the connection node between the second set of first magnetic flux cancellation type transformer T2 and the inductor L2 becomes V2/2. Thereby, the differential voltage of V2/2 in total is applied to the circuit where the primary winding and the secondary winding of the second magnetic flux cancellation type transformer Ta are connected in series. Since the turn ratio of the second magnetic flux cancellation type transformer Ta is 1:1, a voltage of V2/4 is applied to the primary winding and the secondary winding in the reverse direction to the mode 1, respectively. Therefore, the potential of the connection node between the first set of inductor L1 and the second magnetic flux cancellation type transformer Ta becomes V1+V2/4, and the potential of the connection node between the second set of inductor L2 and the second magnetic flux cancellation type transformer Ta becomes V1−V2/4. Thereby, V1−V2×¾ is applied to the first set of inductor L1 and the second set of inductor L2.

Since each of the modes 4 to 7 becomes the operation in which the states of the first series circuit and the second series circuit of each set in each of the modes 0 to 3 are exchanged, detailed explanation is omitted. That is, the mode 4 corresponds to the exchanged state of the mode 0, the mode 5 corresponds to the exchanged state of the mode 1, the mode 6 corresponds to the exchanged state of the mode 2, and the mode 7 corresponds to the exchanged state of the mode 3. The applied voltages of the first set of inductor L1 and the second set of inductor L2 in each of the modes 4 to 7 become the same as the modes 0 to 3.

In a switching regulator, a high voltage side terminal voltage V2 in which time averages of the voltages applied to the inductors L1, L2 become 0 becomes a high voltage side terminal voltage V2 in an equilibrium state. When driving in the switching pattern shown in FIG. 2, since the voltages applied to the inductors L1, L2 repeat V1−V2/2 and V1−V2×¾ each for the same period, it becomes an equilibrium state with the output voltage at which V1−V2/2+V1−V2×¾=0. The high voltage side terminal voltage V2 which fulfills this condition becomes V2=V1×⅗.

Thus, when the DC voltage conversion circuit 1 is operated using the control signal shown in FIG. 2, the voltage of the low voltage side terminal LV is stepped up 1.6 times, and is outputted to the high voltage side terminal HV.

The switching waveform shown in FIG. 2 is only an example of a suitable waveform for obtaining the voltage boosting ratio of 1.6 times; the ON period of each switching device and the phase relation between the switching devices are not limited to this; and the voltage boosting ratio can also be set freely. That is to say, by adjusting the ON period of each switching device, and the phase relation between the switching devices, the time interval in each mode 0 to 7 can be adjusted, and the high voltage side terminal voltage V2 at which the time average of the voltages applied to the inductors L1, L2 becomes 0 can be adjusted. When driving with the phase difference of 90 degrees as shown in FIG. 2, the canceling effect of ripple becomes the maximum, and the amplitudes of ripple current and ripple voltage become the minimum, but it is not necessary to set the phase difference of 90 degrees.

<Reduction Effect of Ripple Current>

Figure 8:
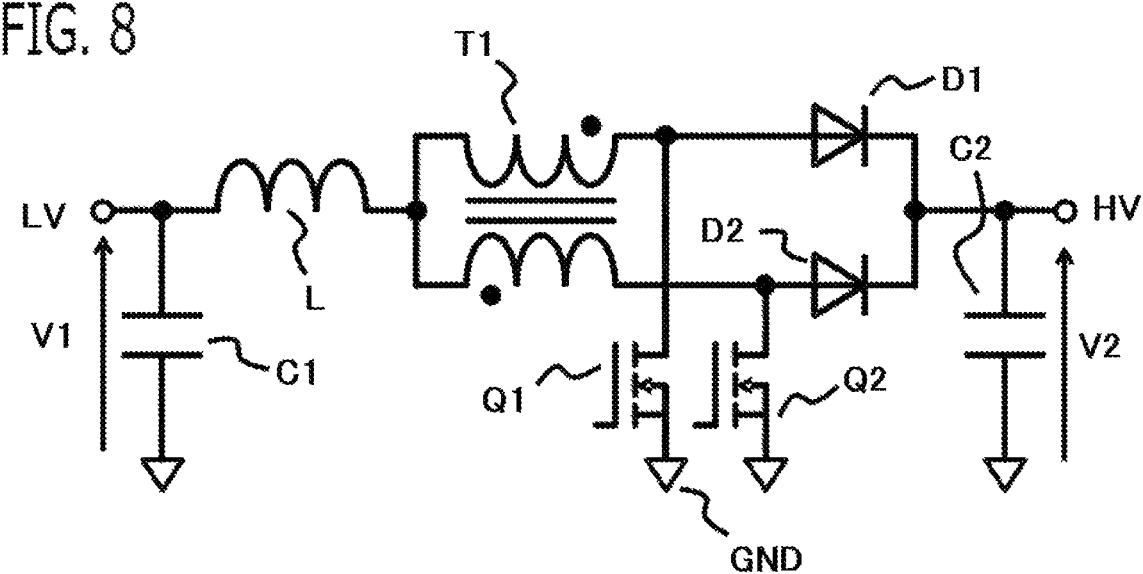
FIG. 8 is a circuit diagram showing two phase step-up circuit according to a comparative example.

Next, effect obtained by the DC voltage conversion circuit 1 will be explained using FIG. 7 to FIG. 10. FIG. 7 and FIG. 8 show voltage converters of comparative examples which are different from the present embodiment. In order to perform an electrically equivalent comparison, a value of the inductor L of these circuits is equal to the combined inductance of the first set and the second set of inductors L1, L2 of the DC voltage conversion circuit 1 according to the present embodiment 1.

The step-up circuit shown in FIG. 7 is a well-known step-up circuit, only one series circuit of an upper diode D1 and a lower switching device Q1 is provided, and a magnetic flux cancellation type transformer is not provided. By repeatedly turning on and off the lower switching device Q1, a step-up operation is performed. The step-up circuit shown in FIG. 8 is a step-up circuit based on the technology of PLT 2, one set of magnetic flux cancellation conversion circuit is provided, and a second magnetic flux cancellation type transformer is not provided. A step-up operation is performed by turning on a switching device Q1 of a first series circuit, and a switching device Q2 of a second series circuit alternately. In order to distinguish a circuit configuration, the step-up circuit of FIG. 7 is referred as a one phase step-up circuit, the step-up circuit of FIG. 8 is referred as a two phase step-up circuit, and the DC voltage conversion circuit 1 according to the present embodiment is referred as a four phase step-up circuit.

Figure 9:
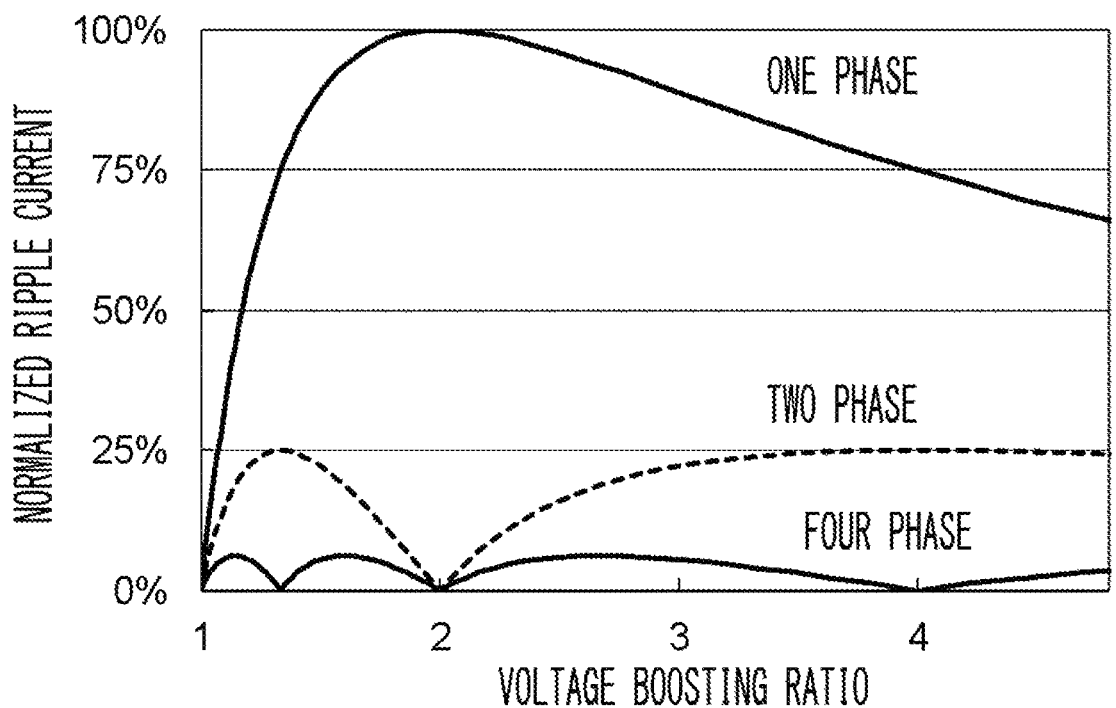
FIG. 9 is a figure explaining effect of the DC voltage conversion circuit according to Embodiment 1.

FIG. 9 shows a graph for showing a calculation result of the ripple current at the time of changing the low voltage side terminal voltage V1 and the voltage boosting ratio so that the high voltage side terminal voltage V2 becomes a constant about these three kinds of step-up circuits. The ripple current is normalized by setting a value when the voltage boosting ratio of the one phase step-up circuit is twice, to 100%. From this result, the DC voltage conversion circuit 1 according to the present embodiment can suppress the maximum ripple current to 1/16 as compared with the one phase step-up circuit of the comparative example.

Figure 10:
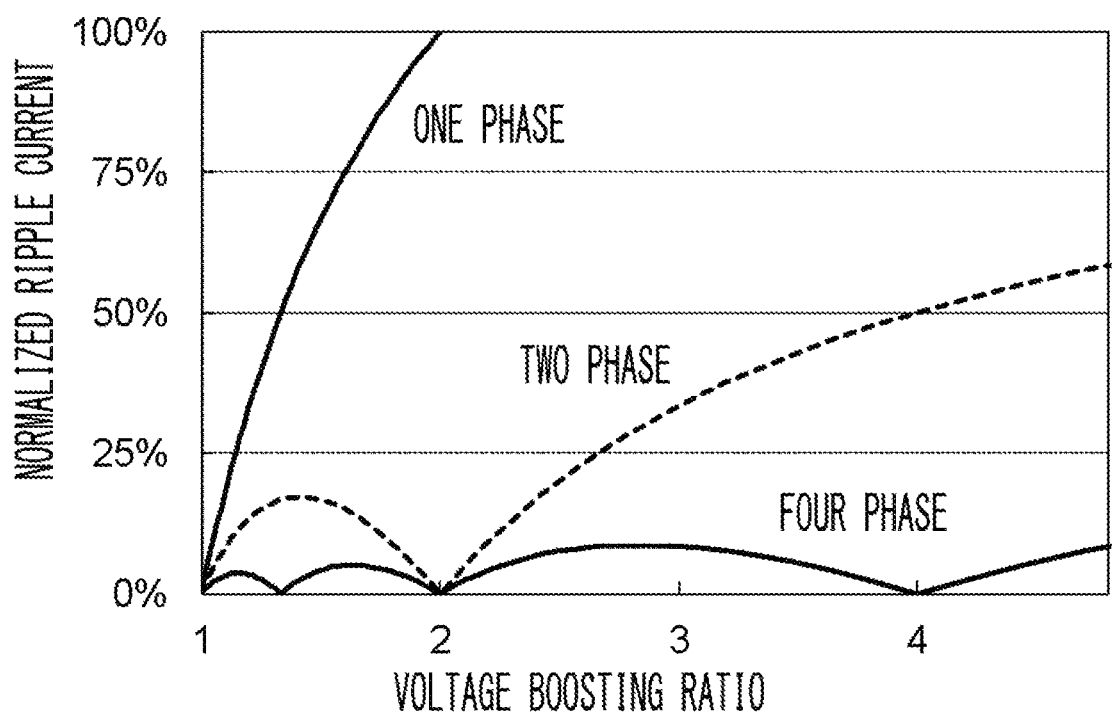
FIG. 10 is a figure explaining effect of the DC voltage conversion circuit according to Embodiment 1.

FIG. 10 shows a graph for showing a calculation result of the ripple current at the time of fixing the low voltage side terminal voltage V1 and changing the voltage boosting ratio about these three kinds of step-up circuits. The ripple current is normalized by setting a value when the voltage boosting ratio of the one phase step-up circuit is twice, to 100%, similarly to FIG. 9. From this result, the DC voltage conversion circuit 1 according to the present embodiment can realize a voltage boosting ratio exceeding twice without significant increase of the ripple current.

Next, it will be explained the principle that the ripple current can be reduced significantly. As explained until now, there are eight operating states (modes 0 to 7) in the one period in which the switching devices Q1 to Q4 are switched. In the condition of the voltage boosting ratio of 1.6 times, during eight operating states, the voltages applied to the first set and the second set of inductors L1, L2 switch between V1−V2/2 and V1−V2×¾ 4 times. Accordingly, the ripple voltage with 4 times frequency of the switching frequency and an amplitude of V2/4 is applied to the first set and the second set of inductors L1, L2. On the other hand, the ripple voltage with 1 times frequency of the switching frequency and an amplitude of V2 between peaks is applied to the inductor of the one phase step-up circuit. Since the ripple current which flows into the inductor is proportional to voltage and inversely proportional to frequency, in the DC voltage conversion circuit 1 according to the present embodiment 1, since the amplitude of the voltage applied to the inductor becomes ¼ times and the frequency becomes 4 times as compared with the one phase step-up circuit, the current ripple can be reduced to 1/16.

Since the ripple current is inversely proportional to an inductance value, when designing so that the ripple current becomes constant, a combined inductance of the first set and the second set of inductors L1, L2 of the DC voltage conversion circuit 1 according to the present embodiment 1 can be reduced to 1/16 of the one phase step-up circuit. Thereby, the miniaturization of the inductor can be attained. Since the frequency of the ripple current becomes 4 times of the one phase step-up circuit, the capacity of the smoothing capacitors C1, C2 of the low voltage side and the high voltage side can be reduced, and the miniaturization of the capacitor can be attained. According to these effects, the miniaturization of the DC voltage conversion circuit itself can be achieved.

As described in the equation (7) of the Non patent literature 1, the step-up circuit has a zero point on the right half plane of the Laplace plane. In a region greater than or equal to a frequency of this zero point, since a gain is constant and only a phase is delayed, a phase margin is not obtained in a feedback control system, but it becomes a hindrance of stability securing. Accordingly, by lowering a control band enough from the zero point frequency, a phase margin is secured, and it is constituted to become a stable feedback control system. An angular frequency ωz of the zero point is Vi/(L×IL). Here, Vi is input voltage, L is inductance, and IL is inductance current. Accordingly, to lower the inductance L to 1/16 is to expand a stably controllable control band up to 16 times of the one phase step-up circuit at a maximum. Thereby, a transient response at load fluctuation can be speeded up. Also from this viewpoint, the capacity of the capacitor C2 can be made small.

In this way, according to the DC voltage conversion circuit 1 of the present embodiment 1, by arranging the general magnetic flux cancellation conversion circuits which is provided with the primary winding and the secondary winding in two stages. The ripple current can be reduced significantly, without providing the special magnetic flux cancellation conversion circuit which has a magnetic core of four legs as PLT 1. Since the ripple current is reduced, the inductor can be miniaturized and the frequency of the control band can be increased by lowering the inductance of the inductor, and the capacitor can be miniaturized by lowering the capacity of the capacitor.

Embodiment 2

Figure 11:
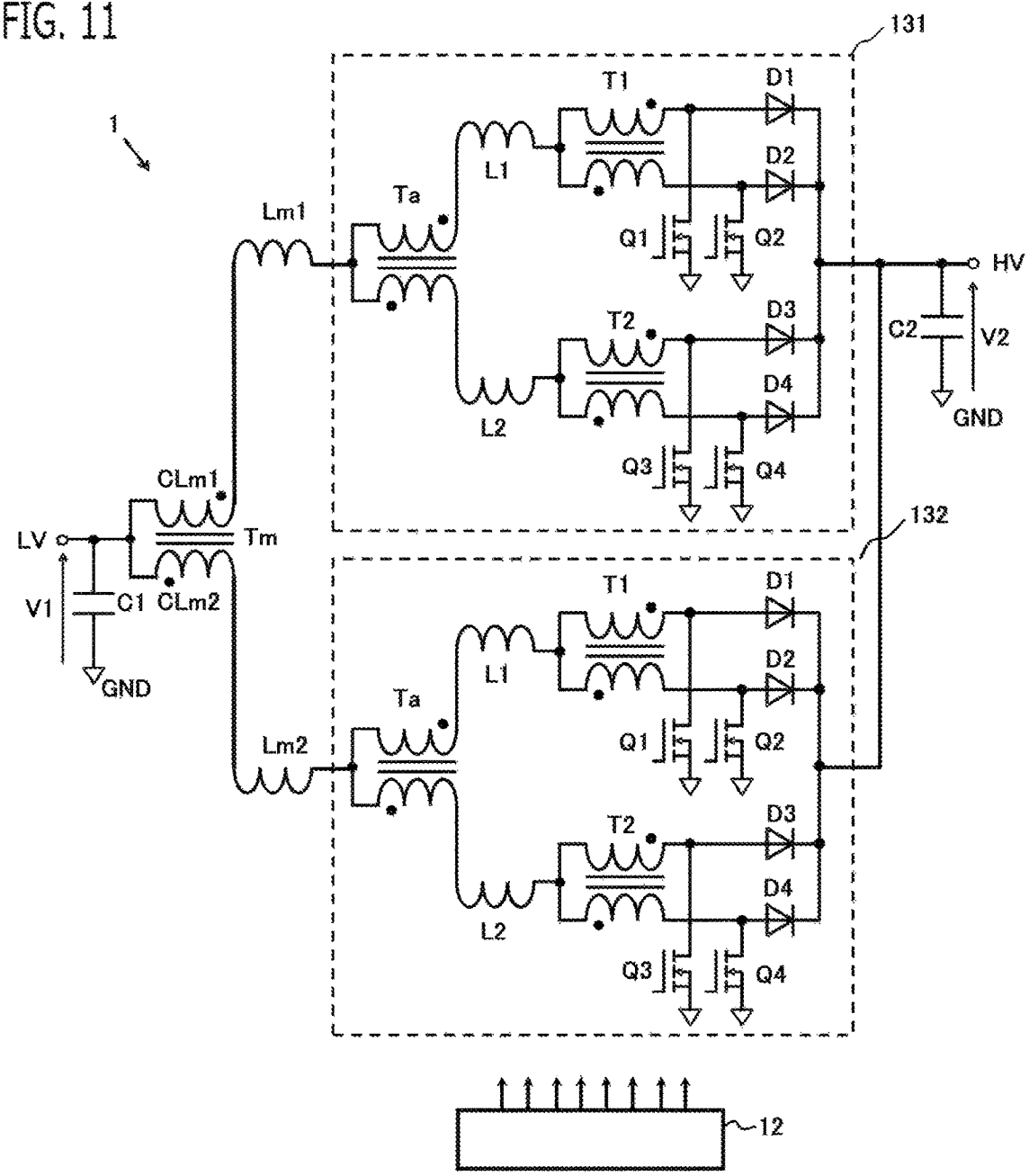
FIG. 11 is a circuit diagram showing a configuration of a DC voltage conversion circuit according to Embodiment 2.

Next, the DC voltage conversion circuit 1 according to Embodiment 2 will be explained with reference to drawings. FIG. 11 is a circuit diagram of the DC voltage conversion circuit 1 according to the present embodiment. The explanation for constituent parts the same as those in Embodiment 1 will be omitted.

Even in the present embodiment, the DC voltage conversion circuit 1 is provided with two sets of magnetic flux cancellation conversion circuits and second magnetic flux cancellation type transformer Ta which are similar to Embodiment 1. However, in the present embodiment, N-th power of 2 of two-stage cancellation conversion circuits each of which is provided with the two sets of magnetic flux cancellation conversion circuits and the second magnetic flux cancellation type transformer Ta (N is a natural number greater than or equal to one) are provided. N stages of stages each of which connects the N-th power of 2 of two-stage cancellation conversion circuits two by two to one additional magnetic flux cancellation type transformer Tm via respective additional inductors to combine into one are provided to connect to the low voltage side terminal LV.

The additional magnetic flux cancellation type transformer Tm has a primary winding CLm1 and a secondary winding CLm2. One end of the primary winding CLm1 is connected to the first two-stage cancellation conversion circuit side via the first additional inductor Lm1, and the other end of the primary winding CLm1 is connected to the other end of the secondary winding CLm2 and the low voltage side terminal LV side. One end of the secondary winding CLm2 is connected to the second two-stage cancellation conversion circuit side via the second additional inductor Lm2, and the other end of the secondary winding CLm2 is connected to the other end of the primary winding CLm1 and the low voltage side terminal LV side.

According to this configuration, the ripple current lowered by the first and the second magnetic flux cancellation type transformer which the two-stage cancellation conversion circuit has can be further lowered with N-stage of the additional magnetic flux cancellation type transformers Tm. Since the ripple current is further reduced, the inductance of the inductors can be further lowered, the inductors can be miniaturized, and the frequency of control band can be increased, and also the capacity of the capacitors can be further lowered and the capacitors can be miniaturized.

Similar to the magnetic flux cancellation type transformers T1, T2, Ta, in the additional magnetic flux cancellation type transformer Tm, the primary winding CLm1 and the secondary winding CLm2 are wound around one magnetic core in directions opposite each other, and a magnetic flux of the primary winding CLm1 and a magnetic flux of the secondary winding CLm2 are canceled by each other. The primary winding CLm1 and the secondary winding CLm2 are wound around the magnetic core by a turn ratio of 1:1, and cancel magnetic flux by 1:1.

In the present embodiment, as shown in FIG. 11, it is N=1 and two of the two-stage cancellation conversion circuits are provided. One stage of stage which connects two of the two-stage cancellation conversion circuits 131, 132 to one additional magnetic flux cancellation type transformer Tm via respective additional inductors Lm1, Lm2 to combine into one are provided to connect to the low voltage side terminal LV. That is, in the additional first stage, the first two-stage cancellation conversion circuit 131 is connected to the primary winding CLm1 of the additional magnetic flux cancellation type transformer Tm via the first additional inductor Lm1, and the second two-stage cancellation conversion circuit 132 is connected to the secondary winding CLm2 of the additional magnetic flux cancellation type transformer Tm via the second additional inductor Lm2; thereby, two circuits 131, 132 are combined into one, and the connection node between the primary winding CLm1 and the secondary winding CLm2 of the additional magnetic flux cancellation type transformer Tm is connected to the low voltage side terminal LV.

Figure 13:
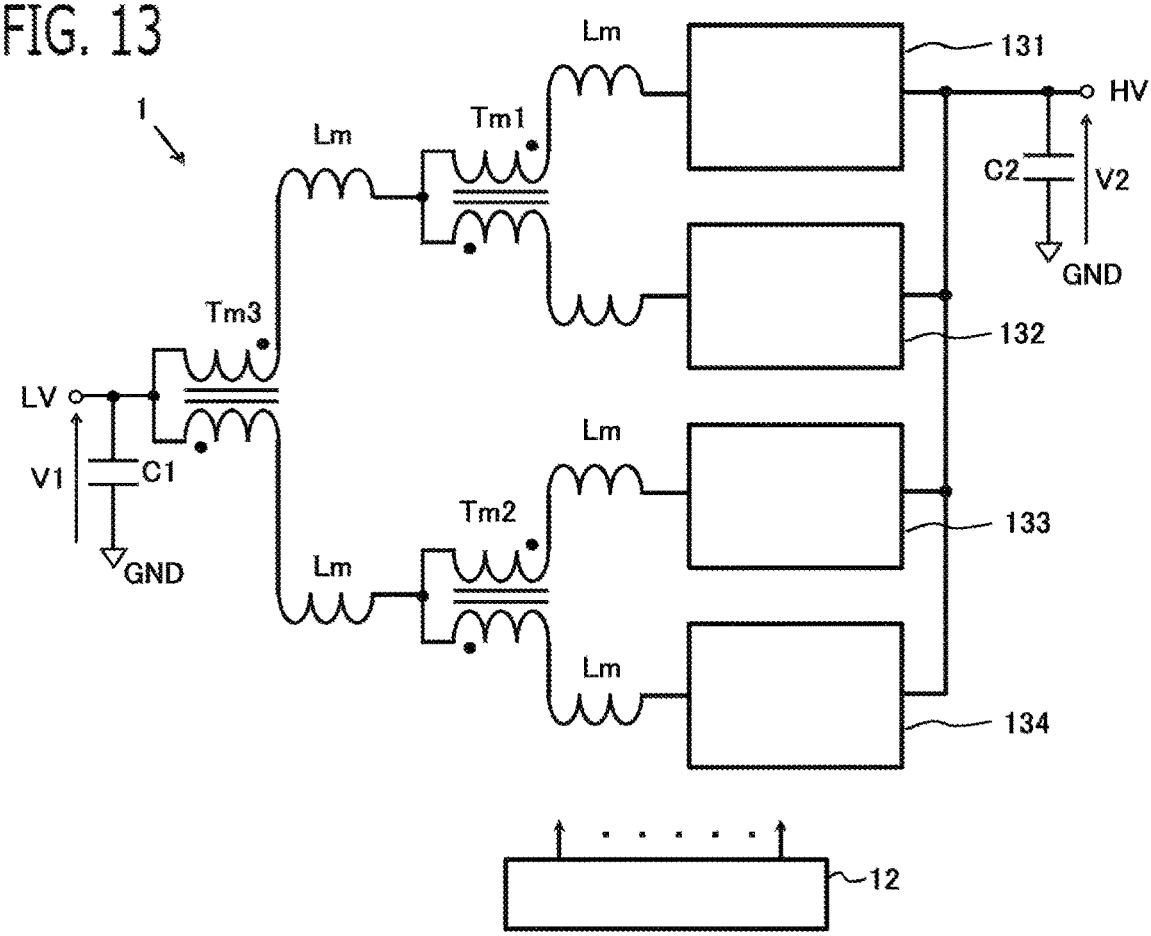
FIG. 13 is a circuit diagram showing a configuration of a DC voltage conversion circuit according to Embodiment 2.

As shown in FIG. 13, in a case of N=2, four of the two-stage cancellation conversion circuits are provided. Then, two stages of stages each of which connects four of the two-stage cancellation conversion circuits 131 to 134 two by two to one additional magnetic flux cancellation type transformer Tm via the respective additional inductors Lm to combine into one are provided to connect to the low voltage side terminal LV.

That is, in the additional first stage, the first two-stage cancellation conversion circuit 131 and the second two-stage cancellation conversion circuit 132 are connected to the first additional magnetic flux cancellation type transformer Tm1 via the respective additional inductors Lm to combine into one, and the third two-stage cancellation conversion circuit 133 and the fourth two-stage cancellation conversion circuit 134 are connected to the second additional magnetic flux cancellation type transformer Tm2 via the respective additional inductors Lm to combine into one. In the additional second stage, the first additional magnetic flux cancellation type transformer Tm1 and the second additional magnetic flux cancellation type transformer Tm2 are connected to the third additional magnetic flux cancellation type transformer Tm3 via the respective additional inductor Lm to combine into one, and the third additional magnetic flux cancellation type transformer Tm3 is connected to the low voltage side terminal LV.

Figure 14:
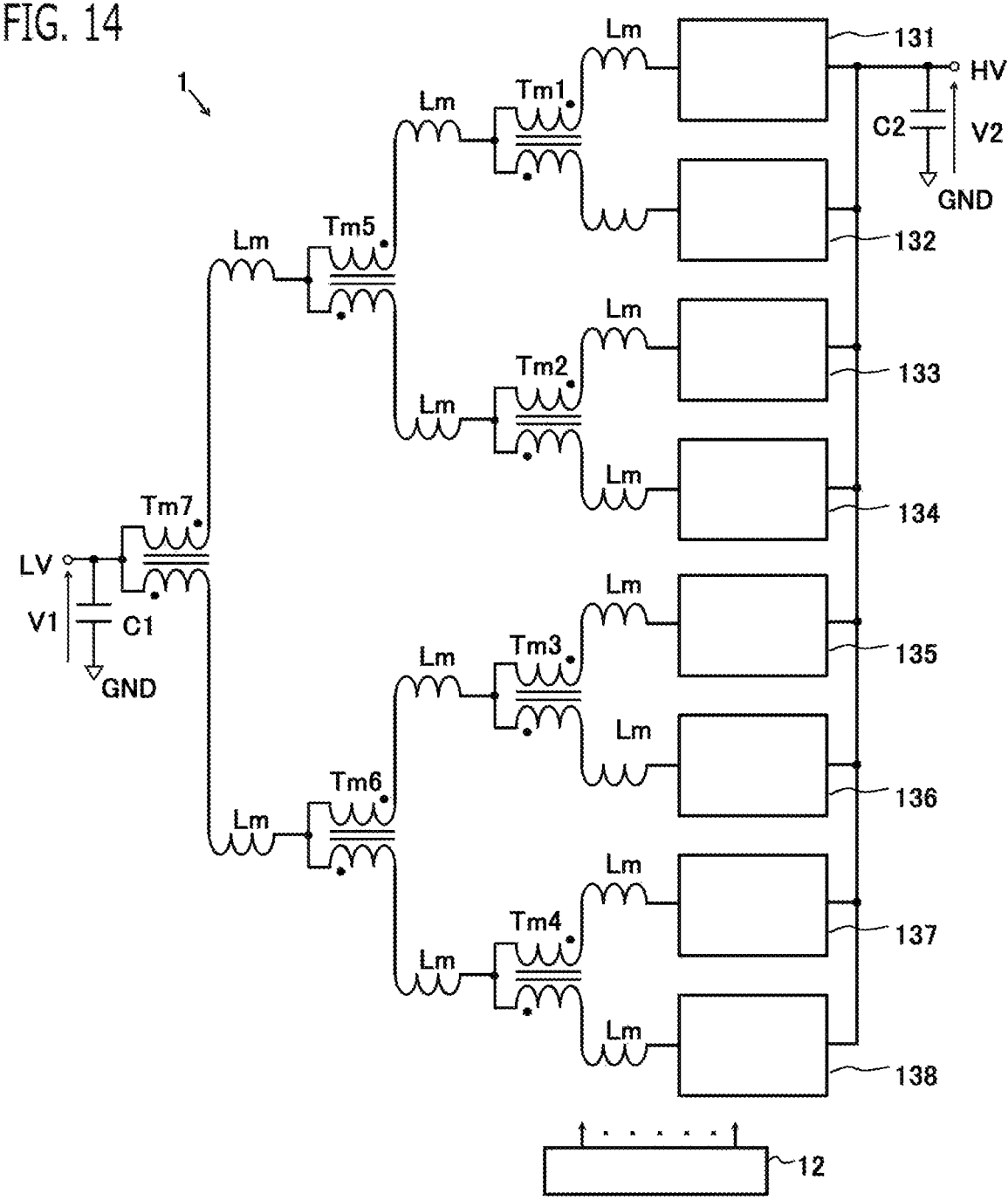
FIG. 14 is a circuit diagram showing a configuration of a DC voltage conversion circuit according to Embodiment 2.

As shown in FIG. 14, in a case of N=3, eight of the two-stage cancellation conversion circuits are provided. Then, three stages of stages each of which connects eight of the two-stage cancellation conversion circuits 131 to 138 two by two to one additional magnetic flux cancellation type transformer Tm via the respective additional inductors Lm to combine into one are provided to connect to the low voltage side terminal LV.

That is, in the additional first stage, the first and the second two-stage cancellation conversion circuits 131, 132 are connected to the first additional magnetic flux cancellation type transformer Tm1 via the respective additional inductors Lm, the third and the fourth two-stage cancellation conversion circuits 133, 134 are connected to the second additional magnetic flux cancellation type transformer Tm2 via the respective additional inductor Lm, the fifth and the sixth two-stage cancellation conversion circuits 135, 136 are connected to the third additional magnetic flux cancellation type transformer Tm3 via the respective additional inductor Lm, and the seventh and the eighth two-stage cancellation conversion circuits 137, 138 are connected to the fourth additional magnetic flux cancellation type transformer Tm4 via the respective additional inductor Lm. In the additional second stage, the first and the second additional magnetic flux cancellation type transformers Tm1, Tm2 are connected to the fifth additional magnetic flux cancellation type transformer Tm5 via the respective additional inductor Lm, and the third and the fourth additional magnetic flux cancellation type transformers Tm3, Tm4 are connected to the sixth additional magnetic flux cancellation type transformer Tm6 via the respective additional inductor Lm. In the additional third stage, the fifth and the sixth additional magnetic flux cancellation type transformers Tm5, Tm6 are connected to the seventh additional magnetic flux cancellation type transformer Tm7 via the respective additional inductor Lm, and then the seventh additional magnetic flux cancellation type transformer Tm7 is connected to the low voltage side terminal LV.

The control circuit 12 makes all switching periods Tsw of the switching devices the same, and provides phase differences of an angle obtained by dividing 90 degrees by the N-th power of 2 among the on-off driving timings of the switching devices of respective sets of the magnetic flux cancellation conversion circuits with each other. According to this configuration, the phase of the on-off driving timing of each switching device is shifted by an equal phase angle interval of a value obtained by dividing 90 degrees by the N-th power of 2 each. By the first, the second, and the N-stage of magnetic flux cancellation type transformers, the ripple current generated by the on-off drive of each switching device can be reduced effectively without deviation. Therefore, reduction effect of the ripple current can be maximized.

In the present embodiment, it is N=1 and the phase difference is 45 degrees. In the case of N=2, the phase difference is 22.5 degrees, and in the case of N=3, the phase difference is 11.25 degrees.

Figure 12:
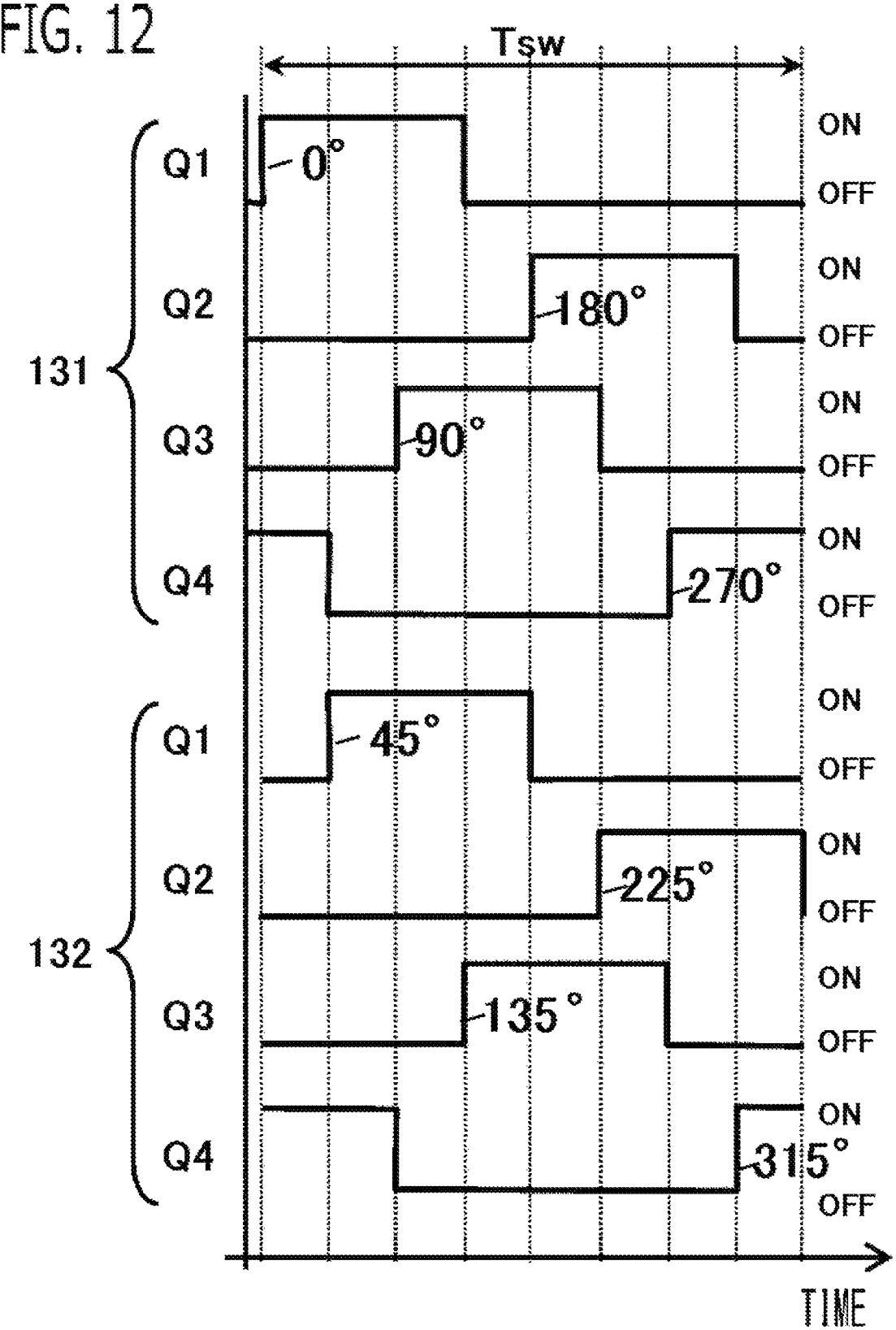
FIG. 12 is a timing chart showing the operation of the DC voltage conversion circuit according to Embodiment 2.

FIG. 12 shows a timing chart which shows an example of the gate signals of each switching device Q1 to Q4 of each of the first and the second two-stage cancellation conversion circuits 131, 132 in the case of N=1 according to the present embodiment. Similar to Embodiment 1, in each set of the magnetic flux cancellation conversion circuit, the phase difference of 180 degrees is provided in the on-off driving timings between the switching device of the first series circuit and the switching device of the second series circuit. Similar to Embodiment 1, in the first two-stage cancellation conversion circuit 131, the phase difference of 90 degrees is provided in the on-off driving timings between the first set of switching devices Q1, Q2 and the second set of switching devices Q3, Q4. Similarly, in the second two-stage cancellation conversion circuit 132, the phase difference of 90 degrees is provided in the on-off driving timings between the first set of switching devices Q1, Q2 and the second set of switching devices Q3, Q4.

In the present embodiment, the phase difference of 45 degrees is provided in the on-off driving timings between the switching devices Q01 to Q4 of the first two-stage cancellation conversion circuit 131 and the switching devices Q1 to Q4 of the second two-stage cancellation conversion circuit 132. The phase difference of 135 degrees, 225 degrees, or 315 degrees may be provided in the on-off driving timings between the switching devices Q1 to Q4 of the first two-stage cancellation conversion circuit 131 and the switching devices Q1 to Q4 of the second two-stage cancellation conversion circuit 132. By providing such phase difference, the phase of the on-off driving timing of each switching device is shifted by an equal phase angle interval of 45 degrees each. By the first, the second, and the additional first stage of magnetic flux cancellation type transformers, the ripple current generated by the on-off drive of each switching device can be reduced effectively without deviation. Therefore, reduction effect of the ripple current can be maximized. When driving each switching device with the phase difference of 45 degrees, the canceling effect of ripple becomes the maximum, and the amplitudes of ripple current and ripple voltage become the minimum, but it is not necessary to set the phase difference of 45 degrees.

According to the present embodiment, since the amplitude of the voltage applied to the inductor becomes ⅛ times and the frequency becomes 8 times as compared with the one phase step-up circuit, the current ripple can be reduced to 1/64.

Since the ripple current is inversely proportional to an inductance value, when designing so that the ripple current becomes constant, a combined inductance of respective inductors of the DC voltage conversion circuit 1 according to the present embodiment can be reduced to 1/64 of the one phase step-up circuit. Thereby, the miniaturization of the inductor can be attained. Since the frequency of the ripple current becomes 8 times of the one phase step-up circuit, the capacity of the smoothing capacitors C1, C2 of the low voltage side and the high voltage side can be reduced, and the miniaturization of the capacitor can be attained. According to these effects, the miniaturization of the DC voltage conversion circuit itself can be achieved.

As mentioned above, since the angular frequency oz of the zero point on the right half plane of the Laplace plane is Vi/(L×IL), to lower the inductance L to 1/64 is to expand a stably controllable control band up to 64 times of the one phase step-up circuit at a maximum. Thereby, a transient response at load fluctuation can be speeded up. Also from this viewpoint, the capacity of the capacitor C2 can be made small.

Similarly, also in the case of N=2 (16 phases) and N=3 (32 phases), by connecting the inductors and the magnetic flux cancellation type transformers stage by stage, the polyphase ripple can be canceled and the inductances of the inductors can be lowered.

Thus, the DC voltage conversion circuit 1 according to the present embodiment can constitute the DC voltage conversion circuit which performs ripple cancellation by N+2-th power of 2 of phases which are different mutually, without using a multi-leg magnetic core. And, the inductances of the inductors are lowered, and the apparatus can be miniaturized and the frequency of control band can be widened.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

Figure 15:
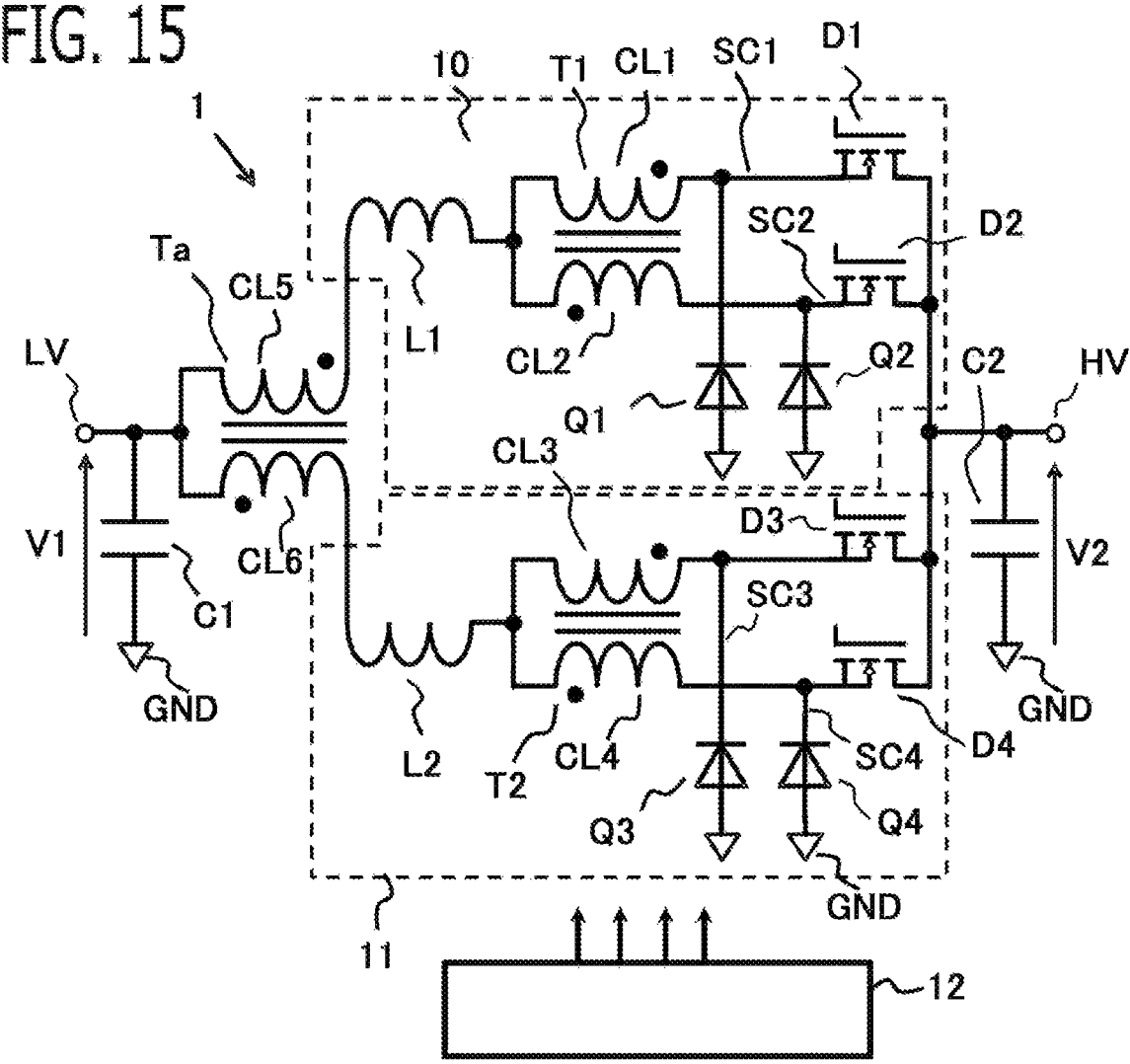
FIG. 15 is a circuit diagram showing a configuration of a DC voltage conversion circuit which performs the step-down operation according to other Embodiments.

(1) In each of the above-mentioned Embodiments, there has been explained the case where the DC voltage conversion circuit 1 is capable of a step-up operation which steps up DC voltage from the low voltage side terminal LV to the high voltage side terminal HV; and each of the first set and second set of lower semiconductor circuits Q1, Q2, Q3, Q4 is provided with a switching device, and each of the first set and second set of upper semiconductor circuits D1, D2, D3, D4 is provided with a diode. However, embodiments of the present disclosure are not limited to the foregoing case. That is to say, as shown in FIG. 15, the DC voltage conversion circuit 1 may be capable of a step-down operation which steps down DC voltage from the high voltage side terminal HV to the low voltage side terminal LV; and each of the first set and second set of lower semiconductor circuits Q1, Q2, Q3, Q4 may be provided with a diode, and each of the first set and second set of upper semiconductor circuits D1, D2, D3, D4 may be provided with a switching device. Even in this case, by performing on-off driving control of the first set and second set of upper switching devices D1, D2, D3, D4 by a method similar to the first set and the second set of switching devices Q1, Q2, Q3, Q4 of the above-mentioned Embodiments, the control circuit 12 can lower the ripple current. Specifically, the control circuit 12 controls the upper switching device D1 of the first set of the first series circuit SC1, instead of the lower switching device Q1 of the first set of the first series circuit SC1 of the above-mentioned Embodiments; the control circuit 12 controls the upper switching device D2 of the first set of the second series circuit SC2, instead of the lower switching device Q2 of the first set of the second series circuit SC2 of the above-mentioned Embodiments; the control circuit 12 controls the upper switching device D3 of the second set of the first series circuit SC3, instead of the lower switching device Q3 of the second set of the first series circuit SC3 of the above-mentioned Embodiments; and the control circuit 12 controls the upper switching device D4 of the second set of the second series circuit SC4, instead of the lower switching device Q4 of the second set of the second series circuit SC4 of the above-mentioned Embodiments.

Figure 16:
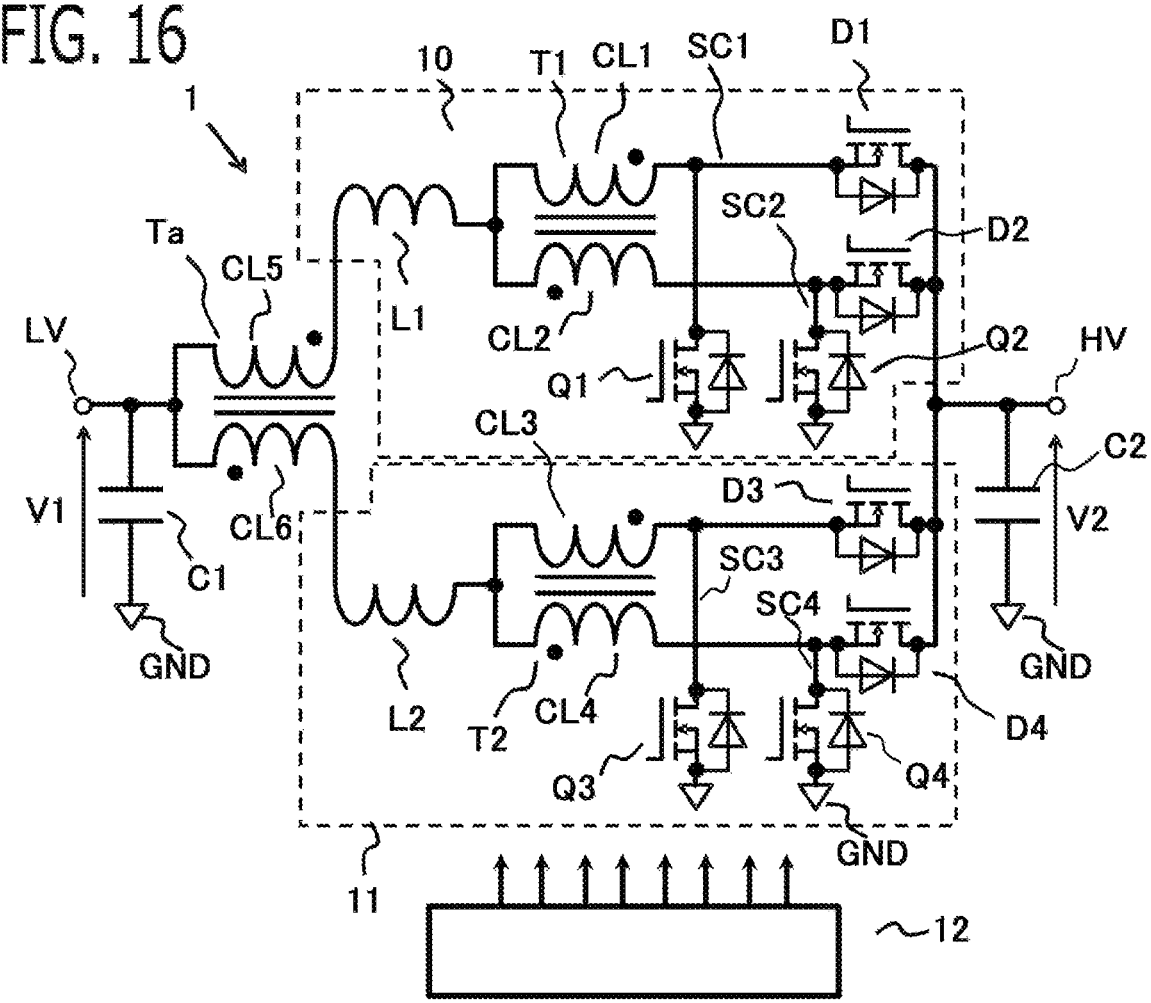
FIG. 16 is a circuit diagram showing a configuration of a DC voltage conversion circuit which performs the step-up operation and the step-down operation according to other Embodiments.

Alternatively, as shown in FIG. 16, the DC voltage conversion circuit 1 may be capable of both of the step-up operation and the step-down operation; each of the first set and the second set of lower semiconductor circuits Q1, Q2, Q3, Q4 may be provided with the switching device and the diode which are connected in parallel with each other, and each of the first set and the second set of upper semiconductor circuits D1, D2, D3, D4 may be provided with the switching device and the diode which are connected in parallel with each other. Even in this case, when performing the step-up operation, the control circuit 12 performs on-off driving control of the switching devices of the lower semiconductor circuits Q1, Q2, Q3, Q4 by a method similar to the lower switching devices Q1, Q2, Q3, Q4 of the above-mentioned Embodiments; and when performing the step-down operation, the control circuit 12 performs on-off driving control of the upper switching devices by a method similar to the lower switching devices Q1, Q2, Q3, Q4 of the above-mentioned Embodiments. Thereby, the ripple voltage can be lowered. Specifically, when performing the step-up operation, the control circuit 12 controls the switching device of the lower semiconductor circuit Q1 of the first set of the first series circuit SC1 by a method similar to the lower switching device Q1 of the first set of the first series circuit SC1 of the above-mentioned Embodiments; the control circuit 12 controls the switching device of the lower semiconductor circuit Q2 of the first set of the second series circuit SC2 by a method similar to the lower switching device Q2 of the first set of the second series circuit SC2 of the above-mentioned Embodiments; the control circuit 12 controls the switching device of the lower semiconductor circuit Q3 of the second set of the first series circuit SC3 by a method similar to the lower switching device Q3 of the second set of the first series circuit SC3 of the above-mentioned Embodiments; and the control circuit 12 controls the switching device of the lower semiconductor circuit Q4 of the second set of the second series circuit SC4 by a method similar to the lower switching device Q4 of the second set of the second series circuit SC4 of the above-mentioned Embodiments. When performing the step-down operation, the control circuit 12 controls the switching device of the upper semiconductor circuit D1 of the first set of the first series circuit SC1, instead of the lower switching device Q1 of the first set of the first series circuit SC1 of the above-mentioned Embodiments; the control circuit 12 controls the switching device of the upper semiconductor circuit D2 of the first set of the second series circuit SC2, instead of the lower switching device Q2 of the first set of the second series circuit SC2 of the above-mentioned Embodiments; the control circuit 12 controls the switching device of the upper semiconductor circuit D3 of the second set of the first series circuit SC3, instead of the lower switching device Q3 of the second set of the first series circuit SC3 of the above-mentioned Embodiments; and the control circuit 12 controls the switching device of the upper semiconductor circuit D4 of the second set of the second series circuit SC4, instead of the lower switching device Q4 of the second set of the second series circuit SC4 of the above-mentioned Embodiments.

(2) In each of the above-mentioned Embodiments, there has been explained the case where the silicon (Si) semiconductor is used for the semiconductor circuits of the switching devices and the diodes. However, a wide gap semiconductor whose band gap is wider than silicon (Si) may be used for part or all of the semiconductor circuits of the switching devices and the diodes. Silicon carbide, gallium nitride based material, diamond, or the like is used for the wide gap semiconductor, for example.

(3) In each of the above-mentioned Embodiments, there has been explained the case where one winding is used as each set of the inductors L1, L2, one winding is used as the primary winding CL5 of the second magnetic flux cancellation type transformer Ta, and one winding is used as the secondary winding CL6 of the second magnetic flux cancellation type transformer Ta. However, when detecting a current which flows into each series circuit SC1, SC2, SC3, SC4, it is necessary to detect the current which flows through each winding of each first magnetic flux cancellation type transformer T1, T2. Since a potential of this part switches between the reference potential GND and the high voltage side terminal HV, it is not easy to use a current detection circuit using shunt resistance.

Then, as shown in FIG. 17, a coupling inductor (hereinafter, referred to as first coupling inductors L1, L2) may be used as each set of the inductors L1, L2, a coupling inductor (hereinafter, referred to as a second coupling inductor CL5) may be used as the primary winding CL5 of the second magnetic flux cancellation type transformer Ta, a coupling inductor (hereinafter, referred to as a third coupling inductor CL6) may be used as the secondary winding CL6 of the second magnetic flux cancellation type transformer Ta, and the second coupling inductor CL5 and the third coupling inductor CL6 may be magnetically coupled by a magnetic core MC so as to magnetically cancel with each other. The first set of the first coupling inductor L1 is used as the first set of inductor L1, and the second set of the first coupling inductor L2 is used as the second set of inductor L2.

In each coupling inductor L1, L2, CL5, CL6, a primary winding and a secondary winding are wound around a magnetic core in the same direction with each other, and a magnetic flux of the primary winding and a magnetic flux of the secondary winding are strengthened each other. The primary winding and the secondary winding are wound around the magnetic core by a turn ratio of 1:1, and magnetic flux is strengthened by 1:1. As shown in FIG. 18, by setting a self-inductance of the primary winding side to La, setting a self-inductance of the secondary winding side to Lb, and setting a mutual inductance to M, each coupling inductor L1, L2, CL5, CL6 can be expressed by a T-type equivalent circuit. From this T-type equivalent circuit, it is seen that the coupling inductor has a function as one winding similar to the inductor, and the primary winding and the secondary winding of the magnetic flux cancellation type transformer; and the DC voltage conversion circuit 1 can perform an operation similar to the configuration of FIG. 1 and the like even in the configuration of FIG. 17.

The other end of the primary winding CL1 of the first set of the first magnetic flux cancellation type transformation T1 is connected to the low voltage side terminal LV via the primary winding L11 of the first set of the first coupling inductor L1 and the primary winding CL51 of the second coupling inductor CL5 which are connected in series. The other end of the secondary winding CL2 of the first set of the first magnetic flux cancellation type transformation T1 is connected to the low voltage side terminal LV via the secondary winding L12 of the first set of the first coupling inductor L1 and the secondary winding CL52 of the second coupling inductor CL5 which are connected in series.

The other end of the primary winding CL3 of the second set of the first magnetic flux cancellation type transformation T2 is connected to the low voltage side terminal LV via the primary winding L21 of the second set of the first coupling inductor L2 and the primary winding CL61 of the third coupling inductor CL6 which are connected in series. The other end of the secondary winding CL4 of the second set of the first magnetic flux cancellation type transformation T2 is connected to the low voltage side terminal LV via the secondary winding L22 of the second set of the first coupling inductor L2 and the secondary winding CL62 of the third coupling inductor CL6 which are connected in series.

A first shunt resistance R1 as a current detection circuit is connected in series to the low voltage side terminal LV side of the primary winding CL51 of the second coupling inductor CL5, a second shunt resistance R2 as a current detection circuit is connected in series to the low voltage side terminal LV side of the secondary winding CL52 of the second coupling inductor CL5, a third shunt resistance R3 as a current detection circuit is connected in series to the low voltage side terminal LV side of the primary winding CL61 of the third coupling inductor CL6, and a fourth shunt resistance R4 as a current detection circuit is connected in series to the low voltage side terminal LV side of the secondary winding CL62 of third coupling inductor CL6. Since plural windings are interposed between the shunt resistance and each series circuit SC1, SC2, SC3, SC4, fluctuation in the potential of the part in which each shunt resistance R1, R2, R3, R4 is provided becomes small, and a current which flows into each series circuit SC1, SC2, SC3, SC4 can be detected stably.

The control circuit 12 detects the current which flows into each series circuit SC1, SC2, SC3, SC4 by each shunt resistance R1, R2, R3, R4 as the current detection circuit, and controls the on-off driving timing of each switching device Q1, Q2, Q3, Q4 so that the detected current value of each series circuit SC1, SC2, SC3, SC4 approaches a current command value of each series circuit SC1, SC2, SC3, SC4. According to this configuration, the current which flows through each series circuit SC1, SC2, SC3, SC4 can be controlled not to be biased among series circuits. For example, the control circuit 12 increases or decreases the ON period of each switching device so that each detected current value approaches each current command value.

Various modifications and alterations of this disclosure will be apparent to those skilled in the art without departing from the scope and spirit of this disclosure, and it should be understood that this is not limited to the illustrative embodiments set forth herein.

REFERENCE SIGNS LIST

1 DC Voltage Conversion Circuit, 10 First Set of Magnetic flux cancellation Conversion Circuit, 11 Second Set of Magnetic flux cancellation Conversion Circuit, 12 Control Circuit, 131, 132 Two-stage Cancellation Conversion Circuit, D1, D2, D3, D4 Upper Semiconductor Circuit, GND Reference Potential, HV High Voltage Side Terminal, LV Low Voltage Side Terminal, L1, L2 Inductor, Q1, Q2, Q3, Q4 Lower Semiconductor Circuit, SC1, SC3 First Series Circuit, SC2, SC4 Second Series Circuit, T1, T2, Ta, Tm Magnetic flux cancellation Type Transformer, Tsw Switching Period, V1 Low Voltage Side Terminal Voltage, V2 High Voltage Side Terminal Voltage

What is claimed is:

1. A non-isolated type DC voltage conversion circuit which converts DC voltage between a low voltage side terminal and a high voltage side terminal, the DC voltage conversion circuit comprising:
   two sets of magnetic flux cancellation conversion circuits each of which is provided with two sets of series circuits in each of which a lower semiconductor circuit connected to a reference potential and an upper semiconductor circuit connected to the high voltage side terminal are connected in series; a first magnetic flux cancellation type transformer which has a primary winding whose one end is connected to an intermediate connection point of a first set of the series circuit, and a secondary winding whose one end is connected to an intermediate connection point of a second set of the series circuit; and a inductor whose one end is connected to the other end of the primary winding and the other end of the secondary winding of the first magnetic flux cancellation type transformer;
   a second magnetic flux cancellation type transformer which has a primary winding whose one end is connected to the other end of the inductor of a first set of the magnetic flux cancellation conversion circuit, and a secondary winding whose one end is connected to the other end of the inductor of a second set of the magnetic flux cancellation conversion circuit; and in which the other end of the primary winding and the other end of the secondary winding are connected to the low voltage side terminal; and
   a control circuit which controls the semiconductor circuits,
   wherein one or both of a step-up operation which steps up DC voltage from the low voltage side terminal to the high voltage side terminal, and a step-down operation which steps down DC voltage from the high voltage side terminal to the low voltage side terminal are possible,
   in a case where at least the step-up operation is possible, the lower semiconductor circuit is provided with at least a switching device, and the upper semiconductor circuit is provided with at least a diode,
   in a case where at least the step-down operation is possible, the lower semiconductor circuit is provided with at least a diode, and the upper semiconductor circuit is provided with at least a switching device, and
   wherein the control circuit changes an ON period of each switching device provided in the semiconductor circuits according to a voltage boosting ratio or a voltage dropping ratio which is set to a target of DC voltage from the low voltage side terminal to the high voltage side terminal.

2. The DC voltage conversion circuit according to claim 1, wherein the control circuit differs respective on-off driving timings of the switching devices provided in the semiconductor circuits with each other.

3. The DC voltage conversion circuit according to claim 2, wherein the control circuit makes all switching periods of the switching devices the same, and provides a phase difference between the on-off driving timings of the switching devices of the first set of magnetic flux cancellation conversion circuit, and the on-off driving timings of the switching devices of the second set of magnetic flux cancellation conversion circuit.

4. The DC voltage conversion circuit according to claim 3, wherein the phase difference is set to 90 degrees.

5. The DC voltage conversion circuit according to claim 1, wherein both of the step-up operation and the step-down operation are possible,
   the lower semiconductor circuit is provided with the switching device and the diode which are connected in parallel with each other, and the upper semiconductor circuit is provided with the switching device and the diode which are connected in parallel with each other.

6. The DC voltage conversion circuit according to claim 1, wherein a magnetic core of the inductor is composed of a material with a good DC superimposing characteristic, and a magnetic core of the magnetic flux cancellation type transformer is composed of a material with small iron loss at AC excitation.

7. The DC voltage conversion circuit according to claim 1, wherein wide gap semiconductors are used for the semiconductor circuits.

8. A non-isolated type DC voltage conversion circuit which converts DC voltage between a low voltage side terminal and a high voltage side terminal, the DC voltage conversion circuit comprising:
two sets of magnetic flux cancellation conversion circuits each of which is provided with two sets of series circuits in each of which a lower semiconductor circuit connected to a reference potential and an upper semiconductor circuit connected to the high voltage side terminal are connected in series: a first magnetic flux cancellation type transformer which has a primary winding whose one end is connected to an intermediate connection point of a first set of the series circuit, and a secondary winding whose one end is connected to an intermediate connection point of a second set of the series circuit; and a inductor whose one end is connected to the other end of the primary winding and the other end of the secondary winding of the first magnetic flux cancellation type transformer;
a second magnetic flux cancellation type transformer which has a primary winding whose one end is connected to the other end of the inductor of a first set of the magnetic flux cancellation conversion circuit, and a secondary winding whose one end is connected to the other end of the inductor of a second set of the magnetic flux cancellation conversion circuit; and in which the other end of the primary winding and the other end of the secondary winding are connected to the low voltage side terminal; and
a control circuit which controls the semiconductor circuits,
wherein one or both of a step-up operation which steps up DC voltage from the low voltage side terminal to the high voltage side terminal, and a step-down operation which steps down DC voltage from the high voltage side terminal to the low voltage side terminal are possible,
in a case where at least the step-up operation is possible, the lower semiconductor circuit is provided with at least a switching device, and the upper semiconductor circuit is provided with at least a diode,
in a case where at least the step-down operation is possible, the lower semiconductor circuit is provided with at least a diode, and the upper semiconductor circuit is provided with at least a switching device, and
wherein N-th power of 2 of two-stage cancellation conversion circuits each of which is provided with the two sets of magnetic flux cancellation conversion circuits and the second magnetic flux cancellation type transformer (N is a natural number greater than or equal to one) are provided,
N stages of stages each of which connects the N-th power of 2 of two-stage cancellation conversion circuits two by two to one additional magnetic flux cancellation type transformer via respective additional inductors to combine into one are provided to connect to the low voltage side terminal,
the additional magnetic flux cancellation type transformer has a primary winding whose one end is connected to the first two-stage cancellation conversion circuit side via the first additional inductor and whose the other end is connected to the low voltage side terminal side, and a secondary winding whose one end is connected to the second two-stage cancellation conversion circuit side via the second additional inductor and whose the other end is connected to the low voltage side terminal side.

9. The DC voltage conversion circuit according to claim 8, wherein the control circuit makes all switching periods of the switching devices the same, and provides phase differences of an angle obtained by dividing 90 degrees by the N-th power of 2, among the on-off driving timings of the switching devices of respective sets of the magnetic flux cancellation conversion circuits with each other.

10. A non-isolated type DC voltage conversion circuit which converts DC voltage between a low voltage side terminal and a high voltage side terminal, the DC voltage conversion circuit comprising:
two sets of magnetic flux cancellation conversion circuits each of which is provided with two sets of series circuits in each of which a lower semiconductor circuit connected to a reference potential and an upper semiconductor circuit connected to the high voltage side terminal are connected in series; a first magnetic flux cancellation type transformer which has a primary winding whose one end is connected to an intermediate connection point of a first set of the series circuit, and a secondary winding whose one end is connected to an intermediate connection point of a second set of the series circuit; and a inductor whose one end is connected to the other end of the primary winding and the other end of the secondary winding of the first magnetic flux cancellation type transformer;
a second magnetic flux cancellation type transformer which has a primary winding whose one end is connected to the other end of the inductor of a first set of the magnetic flux cancellation conversion circuit, and a secondary winding whose one end is connected to the other end of the inductor of a second set of the magnetic flux cancellation conversion circuit; and in which the other end of the primary winding and the other end of the secondary winding are connected to the low voltage side terminal; and
a control circuit which controls the semiconductor circuits,
wherein one or both of a step-up operation which steps up DC voltage from the low voltage side terminal to the high voltage side terminal, and a step-down operation which steps down DC voltage from the high voltage side terminal to the low voltage side terminal are possible,
in a case where at least the step-up operation is possible, the lower semiconductor circuit is provided with at least a switching device, and the upper semiconductor circuit is provided with at least a diode,
in a case where at least the step-down operation is possible, the lower semiconductor circuit is provided with at least a diode, and the upper semiconductor circuit is provided with at least a switching device, and
wherein a first coupling inductor is used as the inductor,
a second coupling inductor is used as the primary winding of the second magnetic flux cancellation type transformer,
a third coupling inductor is used as the secondary winding of the second magnetic flux cancellation type transformer,
the second coupling inductor and the third coupling inductor are magnetically coupled by magnetic core so as to magnetically cancel with each other,
each of the first, second, and third coupling inductors has a primary winding and a secondary winding which are wound around magnetic core in direction which mutually intensify magnetic flux, respectively, the other end of the primary winding of the first magnetic flux cancellation type transformer is connected to the low voltage side terminal via the primary winding of the first coupling inductor and the primary winding of the second or third coupling inductor which are connected in series, and the other end of the secondary winding of the first magnetic flux cancellation type transformer is connected to the low voltage side terminal via the secondary winding of the first coupling inductor and the secondary winding of the second or third coupling inductor which are connected in series.

11. The DC voltage conversion circuit according to claim 10, wherein a current detection circuit is provided at each of the low voltage side terminal side of the primary winding of the second coupling inductor, the low voltage side terminal side of the secondary winding of the second coupling inductor, the low voltage side terminal side of the primary winding of the third coupling inductor, and the low voltage side terminal side of the secondary winding of the third coupling inductor, and the control circuit detects current which flows into each of the series circuits by each of the current detection circuits, and controls on-off driving timing of each of the switching devices so that a current detected value of each of the series circuits approaches a current command value of each of the series circuits.

* * * * *